(12) United States Patent
Elworthy

(10) Patent No.: US 6,505,157 B1
(45) Date of Patent: Jan. 7, 2003

(54) APPARATUS AND METHOD FOR GENERATING PROCESSOR USABLE DATA FROM NATURAL LANGUAGE INPUT DATA

(75) Inventor: David Elworthy, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,385

(22) Filed: Feb. 23, 2000

(30) Foreign Application Priority Data

Mar. 1, 1999 (GB) .............................................. 9904663

(51) Int. Cl.[7] .............................................. G10L 15/18

(52) U.S. Cl. ....................................... 704/257; 704/255

(58) Field of Search ............................... 704/1, 2, 9, 10, 704/255, 256, 257

(56) References Cited

U.S. PATENT DOCUMENTS

| | | | | | |
|---|---|---|---|---|---|
| 5,414,833 | A | * | 5/1995 | Hershey et al. ............. | 395/575 |
| 5,519,608 | A | * | 5/1996 | Kupiec .................. | 364/419.08 |
| 5,642,519 | A | * | 6/1997 | Martin ....................... | 395/759 |
| 5,721,939 | A | * | 2/1998 | Kaplan ....................... | 395/759 |
| 5,748,973 | A | * | 5/1998 | Palmer et al. .............. | 395/759 |
| 5,870,706 | A | * | 2/1999 | Alshawi ..................... | 704/255 |
| 6,073,098 | A | * | 6/2000 | Buchsbaum et al. ........ | 704/255 |
| 6,243,679 | B1 | * | 6/2001 | Mohri et al. ................ | 704/256 |
| 6,266,634 | B1 | * | 7/2001 | Buchsbaum et al. ........ | 704/232 |

FOREIGN PATENT DOCUMENTS

| | | |
|---|---|---|
| EP | 0 118 187 A1 | 9/1984 |
| EP | 0 737 928 A1 | 10/1996 |
| GB | 2 269 923 B | 2/1994 |

OTHER PUBLICATIONS

"Deterministic Part–of–Speech Tagging with Finite–State Transducers" (E. Roche and Y. Schabes; Computational Linguistics 21(2) pp. 227 to 253).

"Partial Parsing via Finite–State Cascades" (S. Abney; Proceedings of the ESSLLI '96 Robust Parsing Workshop 1996).

"Automatic Error Detection in Part of Speech Tagging" (D. Elworthy in "New Methods in Language Precision" Editors Daniel Jones and Harold Somers, Longman 1997, pp. 256–268,.

"A Practical Part–of–Speech Tagger" (D. Cutting et al in "The Proceedings of the Third Conference on Applied natural Language Processing", 1992, pp. 133 to 140).

* cited by examiner

Primary Examiner—Marsha D. Banks-Harold
Assistant Examiner—Susan McFadden
(74) Attorney, Agent, or Firm—Fitzpatrick, Cella, Harper & Scinto

(57) ABSTRACT

Apparatus generates data in processor usable form from natural language input data units in different unit categories. Input data categorized into categories generates data units having unit identification data and corresponding unit category data for input to a cascaded plurality of matching processing stages. Each matching processing stage of this cascade except the first uses any unmatched unit category data and group category data from previous matching processing stages in place of matched category data to match the unit and/or group category data with at least one predetermined pattern of unit and/or group category data. New group category data is output for any unit and/or group category matching each predetermined pattern of unit and/or group category data. At least one of the matching processing stages outputs unit data corresponding to matched unit category data as a plurality of variables. At least one of these variables is indexed by another of the variables.

33 Claims, 16 Drawing Sheets

APPARATUS AND METHOD FOR GENERATING PROCESSOR USABLE DATA FROM NATURAL LANGUAGE INPUT DATA

The present invention generally relates to a method and apparatus for generating data in a processor usable form from input data in the form of units in a natural language. In particular the present invention relates to an interface between a natural language input and a processor usable data output.

With the continuing advancement of computers and data processing equipment, wherein the operation of the equipment has become evermore complicated, there is a need to simplify the user interface to provide a more "user friendly" interface which can used intuitively thereby reducing the training required by the user.

When a user wishes a computer or data processor apparatus to carry out an operation, an instruction must be entered by the user. The use of natural language as a method of entering instructions or data has been investigated for example in EP-A-0118187 the content of which is hereby incorporated by reference.

When natural language is used instead of simply entering key words, it is necessary for the meaning of the entered natural language instructions to be determined. The interpretation of the meaning of natural language input requires the use of a parser. Parsers can be roughly divided into two types. Parsers which use a full linguistic analysis based on theoretical approaches have been dominant in the 1980's because this approach appeared to offer the reward of extracting a much more detailed linguistic analysis. However, such systems have disadvantages, in particular, such parsers are difficult to design and maintain and they require large computational resources. Examples of parsers which use full linguistic analysis are disclosed in GB-A-2269923 and EP-A-0737928 the contents of which are hereby incorporated by reference.

Another form of parser which is used by the natural language community concerned with building systems is a simpler language processing technology which draws on finite state technology and extensions to it. In recent years finite state technology has reasserted itself in the natural language processing community and recent research in the finite state language processing field is described in a paper entitled "Deterministic Part-of-Speech Tagging with Finite-State Transducers" (E. Roche and Y. Schabes; Computational Linguistics 21(2) Pages 227 to 253) the content of which is hereby incorporated by reference. The emergence of finite state technologies has been driven partly by the limitations of the heavy-duty linguistic approach, partly by the need to process very large volumes of free text, and partly because of a result of a greater understanding of how to make effective finite-state language component.

A finite-state parser is described in a paper entitled "Partial Parsing via Finite-State Cascades" (S. Abney; Proceedings of the ESSLLI '96 Robust Parsing Workshop 1996) the content of which is hereby incorporated by reference. It is acknowledged in this paper that the finite state parsing technique is able to extract and output the linguistic structure of the input text efficiently. Thus although the parser is able to provide syntactic structure, it does not provide semantic information.

It is an object of the present invention to provide a parser which uses multi-level processing to extract syntactic and semantic information from input natural language to output data in a processing usable form as indexed variable.

One aspect of the present invention thus provides a method and apparatus acting as an interface between a natural language input and a processor usable output. The input natural language is in the form of units which are categorized into a plurality of different categories. The category of each data unit is determined to generate unit category data. The unit category data is then input into a pipeline or cascaded processing array in which the unit category data of the input data is matched with patterns of unit category data. Where a pattern is matched, a group category data is output. Subsequent processing stages in the pipeline or cascade can use input unit category data which has not been previously matched at any previous stage and group category data generated at any previous stage which has not been previously matched at any previous stage to match with a predetermined pattern of unit and/or group category data to generate new group category data. In this way groups of units and/or groups are grouped together at successive stages in the cascade. At each stage in the cascade when a match is found, variables are output corresponding to input data units. At least some of the variables are indexed by other variables in order to identify the modification relationship between the input data units as identified by the various stages of the parsing process.

In accordance with this aspect of the present invention, by outputting indexed variables, as matches are found, it is possible to determine not only the syntactic structure of the input natural language, but also to determine semantic information in the form of the modification relationships between the input natural language units i.e. words. The indexing acts as pointers to identify natural language units modifying other natural language units.

In one embodiment the multi-level pipeline or cascaded processing is implemented using finite-state machines, where each stage comprises finite-state machines implementing a particular grammar rule as a set of transitions. The finite-state machines are preferably deterministic in order to reduce the computational resources required in order to implement the finite state machines. However, non-deterministic finite-state machines can also be implemented within the scope of the present invention although they require greater processing resources.

The types of variables identify at least a head unit of a segment of input data corresponding to a segment which matches a predetermined pattern, where the head of a segment does not modify any other unit in the segment, and a modifier which modifies either a head or another modifier. To increase the level of semantic information available in the variables, different types of variables (modifiers) can be used to identify different modification relationships between units. Further, in order to identify the unit which is being modified by the modifier, at least some of the variables are indexed. The content of each variable is a corresponding data unit content and the indexing is achieved by indexing the variables by the data unit content of the data unit being modified.

The indexing of the variables takes place at the stage of processing at which the variable is generated so long as there is no ambiguity in the natural language input. Where there is ambiguity, the natural language grammar rules can be written to accommodate such ambiguity and this results in the use of indexed variables which are indexed using variables generated at an earlier stage in the processing i.e. variables are generated at an initial stage without indexing and are indexed later in the stages.

In an embodiment, the input data comprises words in a natural language. This is processed by a lexical processor with reference to a lexicon containing lexical units and corresponding parts of speech data. Output from the lexical processor are lexical units which match the input words together with the corresponding parts of speech data. The parts of speech data can be used directly as the unit category data. However, because the lexical processor performs no context analysis, there can be errors in the parts of speech assignment. Therefore, in an embodiment the output of the lexical processor is input to a parts of speech tagger which performs a statistical context analysis in order to more correctly assign parts of speech to the lexical units.

The output data generated by the present invention can be used to control the operation of a system. The variables generated from the input data can be compared with variables generated from reference data starting from a variable indicated to be the head of the input data or reference data in accordance with relationships defining equivalence between the variables. The system can then be controlled in accordance with the result of the comparison. Such a system can for example be a data base retrieval system wherein the input data comprises a natural language query and the reference data comprises natural language keys associated with the data in the data base. When a match is found between the query and the key, this can be indicated to the operator and the data can be retrieved.

Embodiments of the present invention will now be described with reference to the accompanying drawings in which.

OVERVIEW

Figure 1:
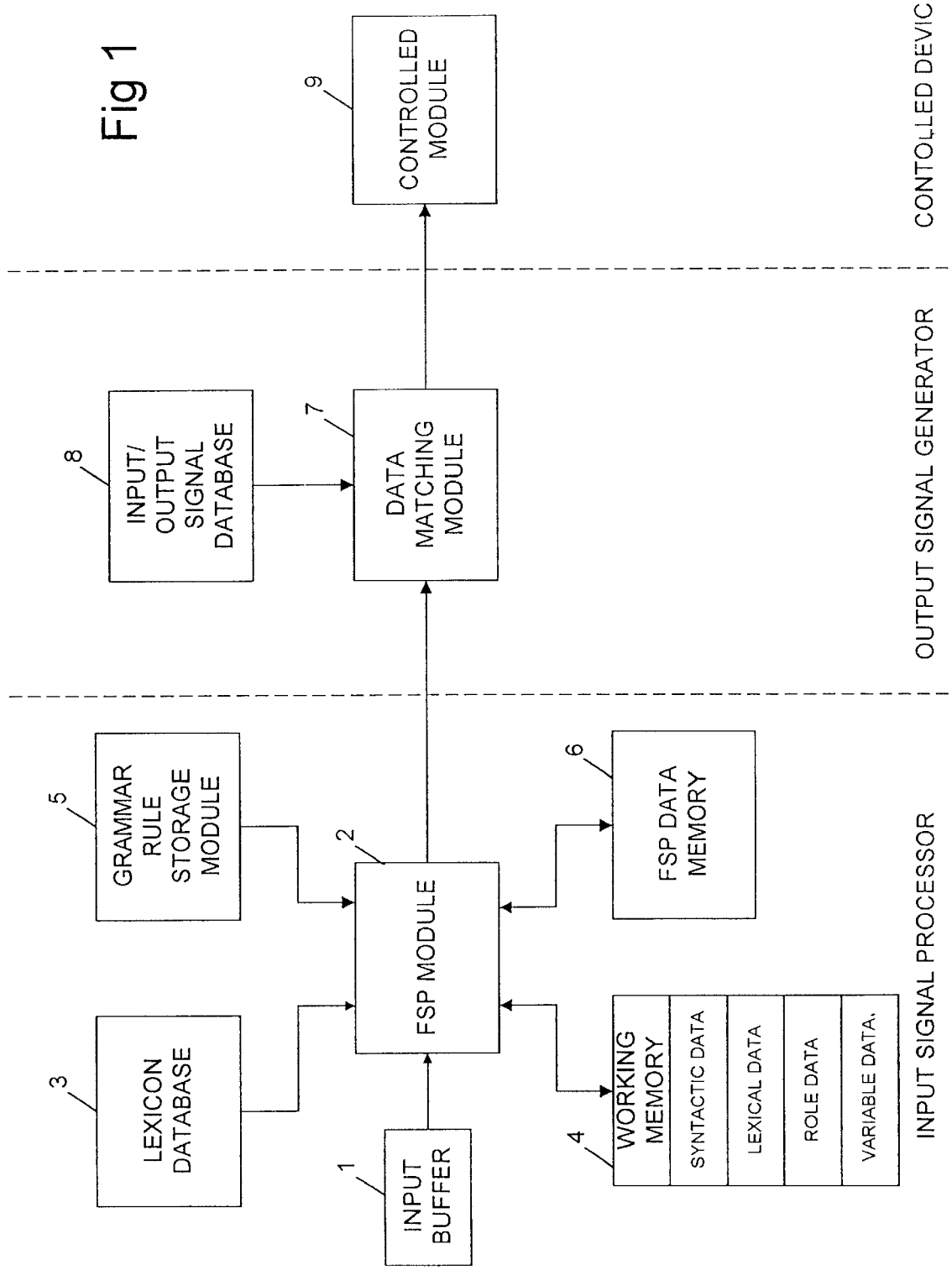
FIG. 1 is a schematic diagram of a processing apparatus in accordance with an embodiment of the present invention.

FIG. 1 is a schematic illustration of an embodiment of the present invention which comprises an input signal processor section, an output signal generator section and a controlled device.

The input signal processor section receives input data in a natural language which is placed in the input buffer (1). This is passed to a finite state parser (FSP) module (2) which generates the output data of the input signal processor section in processor usable form. The finite state processor module (2) accesses lexical data from the lexicon data base (3) and stores the resultant lexical data for the input data in the working memory (4). Also role data is generated from the lexicon data base (3) which indicates the role of the input data in the natural language e.g. parts of speech . The finite state parser module (2) operates in accordance with the finite state parser data in memory (6) in order to generate syntactic data which is stored in the working memory (4) and to generate the variable data which is stored in the working memory (4).

The finite state parser module (2) reads grammar rules from the grammar rule storage module (5) in order to form the finite state parser data which is stored in the memory (6). Thus the finite state parser module is configured in accordance with the grammar rules in the storage module (5). This configuration operation is performed as part of the design of the finite state parser module (2).

The data output from the input signal processor section by the finite state parser module (2) is variable data indicating the modification relationships between lexical units in the lexical data and syntactic data. This is received by the data matching module (7) in the output signal generator. The data matching module (7) performs a matching operation between the received data and data stored in an input/output signal data base (8) as will be described in more detail hereinafter. Dependent upon the matching, an output signal is generated to a controlled module (9) in the controlled device section.

HARDWARE

Figure 2:
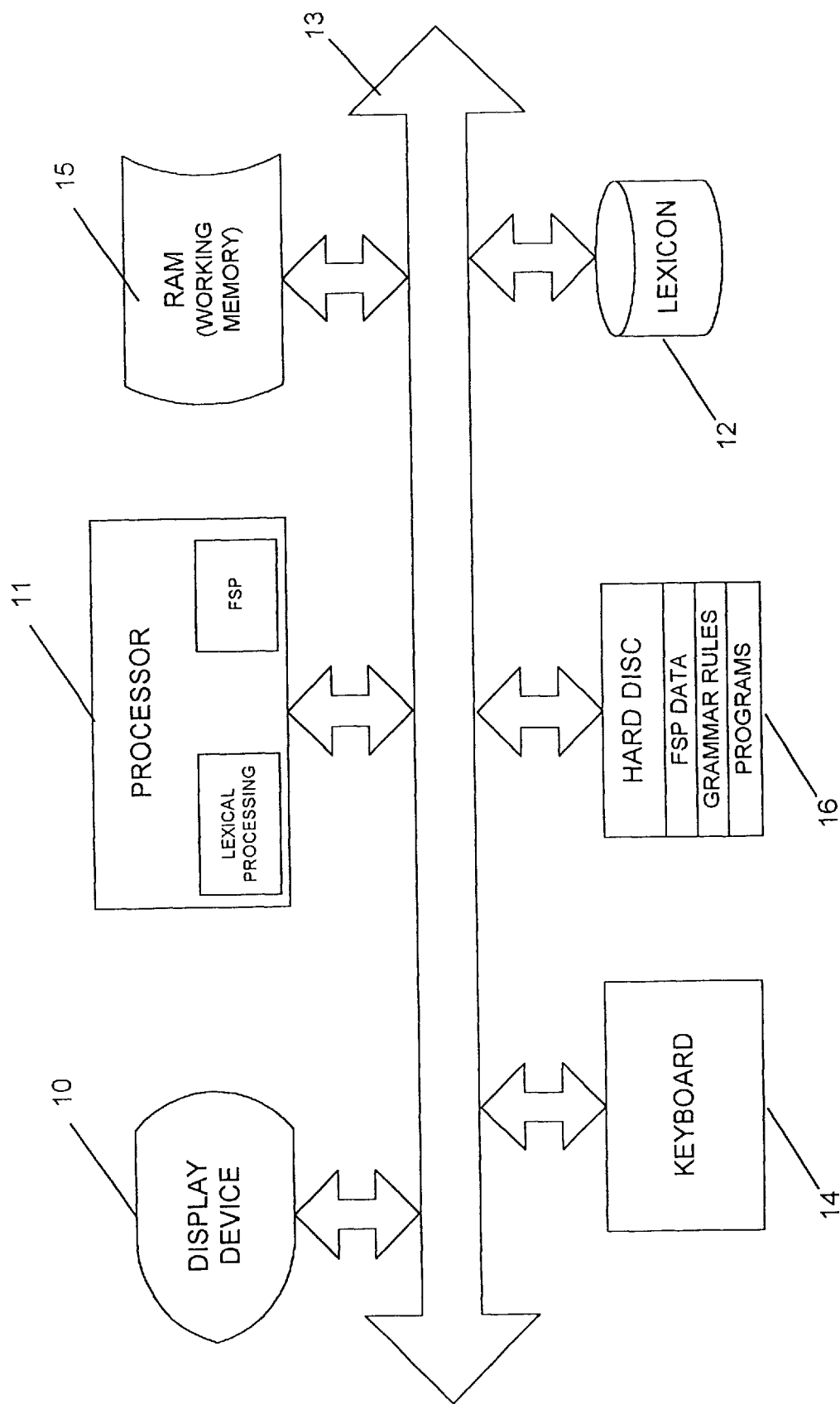
FIG. 2 is a schematic diagram of a processing apparatus embodied as a computer system.

In this embodiment the input signal processor section is implemented using a multipurpose computer appropriately programmed. FIG. 2 illustrates such hardware.

The display (10) is provided to display input text in a natural language. The processor (11) within the computer performs two separate functions: lexical processing and finite state parsing. The lexical processing is performed on input data with reference to a lexicon (12). This generates lexical data which is stored in random access memory (RAM) (15) operating as the working memory. The finite state parser (FSP) operated by the processor (11) parses the electrical data in the working memory to generate syntactic and variable data which is also stored in the RAM (15). The hard disk (16) is provided for storing the finite state parser data used to configure the finite state parser operated in the processor (11). The hard disk also stores the grammar rule data and the programmes to implement the lexical processing and finite state parser within the processor (11). A keyboard (14) is also provided to enable the input of data in a natural language.

The output signal generator could also be implemented within the computer of FIG. 2 and in such an embodiment the processor (11) will also implement a further process to match the output of the parser with data in a data base to generate a control signal.

FUNCTIONAL DESCRIPTION

Figure 3:
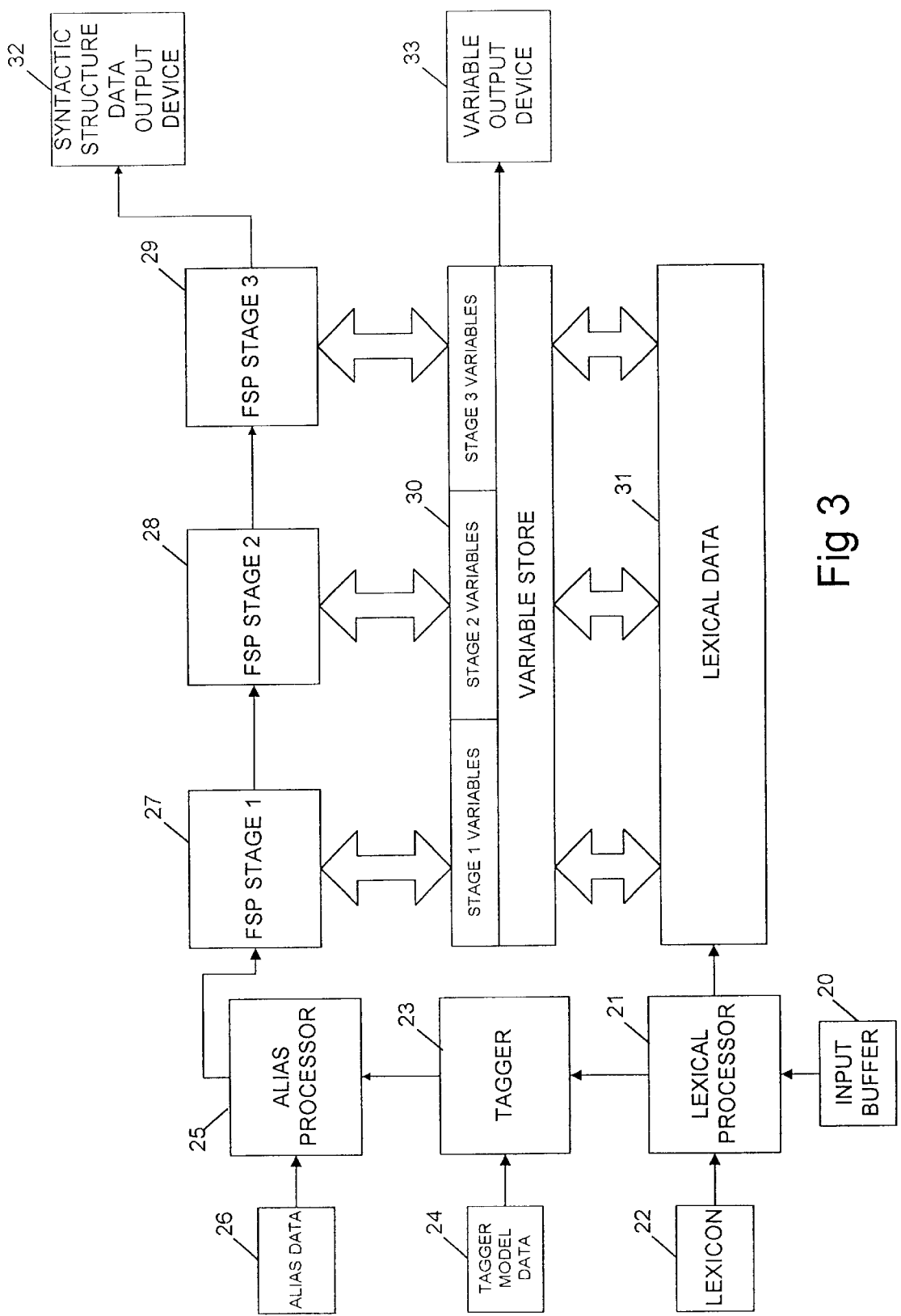
FIG. 3 is a functional diagram of a processing system of an embodiment of the present invention.

FIG. 3 is an illustration of the functional features of the embodiment of the present invention.

An input buffer (20) receives text in a natural language. This is input to a lexical processor (21) which refers to a lexicon (22). The lexical processor matches the input words with words in the lexicon. In this embodiment all inflections of the input words are included in the lexicon and thus in order to obtain output lexical data it is simply necessary to look up the input words in the lexicon. The output from the lexicon is thus the word itself and the role of the word i.e. one or more parts of speech to the word. The lexical data (the words) are stored in the lexical data store (31). The role data for each word which is output from the lexical processor (21) can comprise one or more parts of the speech. However, the parser requires a single part of speech for each word and thus further processing of the parts of speech is required. Further, because the lexical processor (21) has obtained parts of speech for each word without taking into account the context of the words, the selected parts of speech for a word may require correction. This is achieved using a tagger (23). Taggers are well known in the art and perform a statistical context analysis on parts of the speech for natural language in order to try to determine the most likely parts of speech for words having regard to the context of the words. For example, a description of taggers can be found in "Automatic Error Detection in Part of Speech Tagging" (D. Elworthy in "New methods in Language Precision" Editors Daniel Jones and Harold Somers, Longman 1997, pages 256 to 268) and "A Practical Part-of-Speech Tagger" (D. Cutting et al in "The Proceedings of the Third Conference on Applied Natural Language Processing", 1992, pages 133 to 140) the contents of which are hereby incorporated by reference. Since the operation of such taggers are well known in the art and would be understood by a skilled person, it is sufficient to say that the tagger refers to tagger model data (24) in order to generate parts of speech tags which are output to an alias processor (25) which refers to alias data (26). The alias processor (25) is provided to generate an alias tag which can be used as a generic label for a group of parts of speech. In other words, a tag is generated which refers to a family of parts of speech. This enables a far more compact set of grammar rules to be written which utilise the alias tag as will be described in more detail hereinafter. Thus the output of the alias processor (25) is parts of speech tags and alias tags. These are then input into the various stages of the finite state processor as unit category data. Each stage comprises a number of finite state machines for performing the matching process between the input to the stage and the grammar rules of the stage. The unit category data is input to the first of the finite state processor stages (27). The first finite state processor stage (27) matches the sequence of input unit category data (tags) with patterns of unit category data in accordance with the grammar rules for the first stage. If a match is found, an output group category data (tag) is generated for the matched sequence of unit category data. For matches between unit category data in the sequence, variables are stored in a variable store (30). The variables hold lexical data i.e. words. The type of variables stored in the variable store (30) depend upon the modification relationship between the words in the input natural language text. Variables are stored locally for each stage in the FSP and locally for each group category to which they relate. They can be passed to a succeeding stage in the cascade only if a rule in the grammar definition provides for it as will be described in more detail hereinafter. Any unmatched unit category data is output together with the matched group category data to the next stage.

In the second and third stages (28 and 29) of the finite state parser, the category data is input from a previous stage. Within each of the stages unmatched category data from either the input is matched to a sequence of unit and/or group category data. When a match is found, variables for matches in the category data are stored in the variable store (30). Any unmatched category data is output together with the newly matched group category data.

In FIG. 3 for simplicity only three stages are illustrated for the finite state parser. In the embodiment there is in practice many more as will be described in more detail hereinafter.

Once the final stage of the finite state parser has been implemented, the unmatched category data (tags) and newly matched group category data is output as a syntactic structure by the output device (32). Also, the variables can be output by the device (33) to provide semantic information.

As is clear from the description hereinabove the finite state parser is implemented as a sequence of processing stages in a computer program.

THE PARSING PROCESS

The parsing process uses a grammar definition which comprises a collection of rules which define how to get the output from the input. In this embodiment, the input to the parser is a sequence of words each of which has a single part of speech attached to it. The parser will use the words and parts of speech and will attempt to collect parts of the input into phrases. The phrases are given labels which are similar to parts of speech. Hereinabove parts of a speech have been termed unit categories and labels for phrases have been termed group categories.

The parser uses an approach called finite state cascades. The grammar definition is divided into sections called stages or levels at which one or more rules is to be implemented. Within each stage there are one or more rules each telling the parser that if it sees a pattern of categories in the input then it can construct a phrase of a specific category. The category of the phrase is called the output category of the rule. The input unit categories (parts of speech) are input to the first stage where the rules are defined purely in terms of lexical parts of speech. When all the rules from the stage have been tried, the results are passed to stage 2. Stage 2 rules are defined in terms of the lexical parts of speech not matched in stage 1 and the categories as output from stage 1. There is no limit on the number of stages and the same category can appear as an output category at more than one stage. The only restriction is that the input to the rule is drawn purely from the previous levels and the original input.

Because more than one rule can be given for a stage, more than one rule may match the input. The rules are applied in the sequence in which they appear in the grammar definition. The input to each stage comprises a number of categories (lexical or phrasal). At each stage the matching process tries to match a sequence of categories against a rule. If the given rule matches more than one sequence of categories, the longer sequence of categories is taken as the match. The sequence of input categories are then replaced in the output with a phrasal category. Once the sequence of input categories has been matched to generate the phrasal category, if there is still some input categories left, the matching continues subsequent to the matched phrasal category for the remainder of the input. If for the rule starting at the left most input category no match is found, the left most category is skipped and the matching process is tried again with the next input category. If this fails a further input category is skipped and the process is repeated. The process is continued throughout the input for a rule. After having carried out this process throughout the whole input for a rule, if there is another rule to be implemented at that stage, this next rule is used for carry out the matching as described above.

Once the rules have been performed for a level, the input categories that were skipped for that level and the phrase or categories that were generated for that level are passed on to the next level as the input.

Thus from an input of "tall man with a big dog" (Adj N Prep Det Adj N) passed into a stage which recognises noun groups of the form Det? Adj* N, "tall man" is gathered up into a NG, and then the matching process continues at "with". Since there are no rules for noun groups which start with a preposition, the word "with" is skipped and "a big dog" is gathered up into a NG. The next level receives the categories "NG Prep NG" as its input. In this example, it is determined that a word needs to be skipped after only one word i.e. "with". However, it may take several words before it is identified that there is no match and a word needs to be skipped. For example, for the input "tall man the red with a big dog", "the red" would be matched against Det? Adj, before it was determined that the NG rule could not be completed since no noun follows the word "red". The word "the" would then be skipped and the matching process could start again from the word "red". Once again, the match would fail and the word "red" would be skipped. Following this, since the match will fail, the word "with" is skipped as in the previous example.

This matching approach is termed left-to-right, longest-match strategy.

As described previously, as well as outputting a group (phrasal) category when a match is found, the rules also allow parts of the input to be stored as variables. As will be described hereinafter, the variables are set either from the words of the input, or from variables which were set at previous levels. Variables store lists of words locally for a stage of processing. Variables can only be accessed by succeeding stages of the rules.

GRAMMAR DEFINITION

The grammar is defined in terms of categories. In this embodiment unit categories comprise parts of speech e.g. noun, verb etc. They can also be used for specific words with or without a part of speech.

In this embodiment the lexicon generates parts of speech for the input text using the BNC tag set as illustrated in Table 1 below:

TABLE 1

| TAG | CATEGORY |
|---|---|
| | TAGS FOR PARTS OF SPEECH |
| AJ0 | adjective e.g. good, old |
| AJC | comparative adjective e.g. better, older |
| AJS | superlative adjective e.g. best, oldest |
| AT0 | article e.g. the, a, an, no |
| AV0 | adverb e.g. often, well, longer, furthest |
| AVP | adverb particle e.g. up, off, out |
| AVQ | wh-adverb e.g. when, how, why |
| CJC | coordinating conjunction e.g. and or but |
| CJS | sub-ordinating conjunction e.g. although, when |
| CJT | the sub-ordinating conjunction that, when introducing a relative clause, as in "the day that follows Christmas" |
| CRD | cardinal numeral e.g. one, 3, fifty-five |
| DPS | possessive determiner form e.g. your, their, his |

TABLE 1-continued

| TAG | CATEGORY |
|---|---|
| DT0 | general determiner which is not a DTQ e.g. this both in "this is my house" and "this is mine" |
| DTQ | wh-determiner e.g. which, what, whose |
| EX0 | existential there, the word "there" appearing in the constructions "there is..." "there are..." |
| ITJ | interjection or other isolate e.g. oh, yes, mhm |
| NN0 | common noun, neutral for number e.g. aircraft, data, committee |
| NN1 | singular common noun e.g. pencil, goose, time, revelation |
| NN2 | plural common noun e.g. pencils, geese, times, revelations |
| NP0 | proper noun e.g. London, Michael, Mars, IBM |
| ORD | ordinal numeral e.g. first, sixth, 77th, next, last |
| PNI | indefinite pronoun e.g. none, everything |
| PNP | personal pronoun e.g. I, you, them, ours |
| PNQ | wh-pronoun e.g. who, whoever, whom |
| PNX | reflexive pronoun e.g. myself, yourself, itself, ourselves |
| POS | the possessive or genitive marker 's or ' |
| PRF | the preposition of |
| PRP | preposition, other than of e.g. about, at, in, on behalf of, with |
| TO0 | the infinitive marker to |
| UNC | unclassified items which are not appropriately classified as items of the English lexicon e.g. foreign words, typographical symbols, formulae |
| VBB | the present tense forms of the verb, be, except for is or 's am, are 'm, 're, be (subjunctive or imperative), ai (as in ain't) |
| VBD | the past tense forms of the verb be, was, were |
| VBG | the -ing form of the verb be, being |
| VBI | the infinitive form of the verb be, be |
| VBN | the past participle form of the verb be, been |
| VBZ | the -s form of the verb be, 's |
| VDB | the finite base form of the verb do, do |
| VDD | the past tense form of the verb do, did |
| VDG | the -ing form of the verb do, doing |
| VDI | the infinitive form of the verb do, do |
| VDN | the past participle form of the verb do, done |
| VDZ | the -s form of the verb do, does |
| VHB | the finite base form of the verb have, have, 've |
| VHD | the past tense form of the verb have, had, 'd |
| VHG | the -ing form of the verb have, having |
| VHI | the infinitive form of the verb have, have |
| VHN | the past participle form of the verb have, had |
| VHZ | the -s form of the verb have, has, 's |
| VM0 | modal auxiliary verb e.g. can, could, will, 'll, 'd, wo (as in won't) |
| VVB | the finite base form of lexical verbs e.g. forget, send, live, return |
| VVD | the past tense form of lexical verbs e.g. forgot, sent, lived, returned |
| VVG | the -ing form of lexical verbs e.g. forgetting, sending, living, returning |
| VVI | the infinitive form of lexical verbs e.g. forget, send, live, return |
| VVN | the past participles form of lexical verbs, e.g. forgotten, sent, lived, returned |
| VVZ | the -s form of lexical verbs, e.g. forgets, sends, lives, returns |
| XX0 | the negative particle not or n't |
| ZZ0 | alphabetical symbols e.g. A, a, B, b, C, c, D, d |
| | TAGS USED FOR PUNCTUATION |
| PUL | left bracket (i.e. ( or [) |
| PUN | any mark of separation (i.e. ! ; : ? ...) |
| PUQ | annotation mark (i.e. ' ' " ") |
| PUR | right bracket (i.e. ) or ]) |
| CMA | comma |

The BNC tag set also includes tags where there is uncertainty between two possible analysis. These are illustrated in Table 2 below:

TABLE 2

TAGS USED WHERE THERE IS UNCERTAINTY BETWEEN TWO POSSIBLE ANALYSES

| TAG | CATEGORY |
|---|---|
| AJO-AVO | adjective or adverb |
| AJO-NN1 | adjective or singular common noun |
| AJO-VVD | adjective or past-tense verb |
| AJO-VVG | adjective or -ing form of the verb |
| AJO-VVN | adjective or past participle |
| AVP-PRP | adverb particle or preposition |
| AVQ-CJS | wh-adverb or sub-ordinating conjunction |
| CJS-PRP | sub-ordinating conjunction or preposition |
| CJT-DTO | that as conjunction or determiner |
| CRD-PN1 | one as number or pronoun |
| NN1-NPO | singular common noun or proper noun |
| NN1-VVB | singular common noun or base verb form |
| NN1-VVG | singular common noun or -ing form of the verb |
| NN2-VVZ | plural noun or -s form of lexical verb |
| VVD-VVN | past tense verb or past participle |

The tags generated by the lexical processor are then input to the tagger to perform tag fixing. Tag fixing looks for outputs which have two tags and uses an error detection procedure such as disclosed in the paper by the inventor entitled "Automatic Error Detection in Part of Speech Tagging" referenced hereinabove and replaces them with a single tag. It also replaces some tags with simpler ones where the parser does not need to make a distinction e.g. replacing NN1 and NN2 by just NN. The tags resulting from tag fixing are illustrated in Table 3 below.

TABLE 3

TAGS RESULTING FROM TAG FIXING

| TAG | CATEGORY |
|---|---|
| AJ-AV | adjective or adverb |
| AJ-DT | adjective or determiner |
| AJ-NN | adjective or noun |
| AJ-NN-VV | adjective, noun or verb |
| AJ-PR | adjective or preposition |
| AJ-VV | adjective or lexical verb |
| AV-CJ | adverb or conjunction |
| AV-NN | adverb or noun |
| AV-PP | adverb or preposition |
| AV-VV | adverb or verb |
| NN | noun |
| NN-VV | noun or verb |

In addition to the tags mentioned hereinabove, an anchor tag can be used to mark the beginning and end of the text to be parsed. All of the tags given in Tables 1 to 3 comprise unit categories.

The result of each grammar rule i.e. the output of each stage of the processing is a group category. The tags for the group categories are illustrated in Table 4 below.

TABLE 4

TAGS FOR GROUP CATEGORIES

| TAG | CATEGORY |
|---|---|
| NP | noun phrase |
| PP | prepositional phrase |
| DP | determiner phrase |
| adjP | adjective phrase |
| NG | noun group |
| name | proper name |
| prepp | complex and conjoined preposition phrase |
| vmod | modified verb phrase |
| pmod | prefinal modifier |
| top | top level combination |
| sink | mop up combination |

The grammar rules thus result in the identification of sequences of tags and result in new tags. Some of the tags have syntactic meaning whilst others are provided for computational convenience.

For some of the grammar rules several categories are operated on in the same way. Thus, in order to avoid having to know all of the categories for a family in the grammar rules, an alias tag is used for the family. The aliases used in the grammar rules are given below in Table 5.

TABLE 5

ALIASES FOR UNIT CATEGORIES

| CATEGORY | TAG | PARTS OF SPEECH INCLUDED IN CATEGORY |
|---|---|---|
| adjective | adj | AJO, AJS, AJC, AJ-AV, AJ-DT, AJ-VV, AJ-NN |
| adjective or noun | adjN | AJO, AJS, AJC, AJ-AV, AJ-DT, AJ-NN, AJ-NN-VV, AJ-VV, AV-NN, NN, NN1-NPO |
| adverb | adv | AVO, AV-VV, AVP, AV-CJ |
| adverb or adjective | advj | AJO, AJS, AJC, AJ-AV, AJ-DT, AJ-VV, AJ-NN, AVO, AV-VV, AVP, AV-CJ |
| verb to be | be | VBB |
| conjugation | conj | CJC |
| determiner | det | ATO, DTO |
| gerund | ger | VVG, NN-VV |
| numeral | num | CRD, ORD |
| past participle | ppart | VV, VVD, VVN |
| preposition | prep | AV-PP, AJ-PR, PRP, AVP, AVP-PRP |
| relative pronoun | rel | CJT, DTQ, PNQ |
| mop up category | trail | AJ-PR, AVO, AVP, AV-PP, AVP-PRP |

Thus, where in the grammar rules the tag ATO and DTO can be used, the tag "det" is used in its placed for example.

The grammar rules are written as one or more grammar rule for each stage of the processing. Each rule has on the left hand side of the equals sign its output group category followed in brackets by a list of variables which are set by the rule. On the right hand side of the equals sign is the pattern of categories. The same output group category can occur in more than one rule.

The pattern of categories on the right-hand side of the equation determines the sequence of categories which will be recognised. The patterns are written as regular expressions and are comprised of pattern elements. The simplest pattern element is a category i.e. a unit category or group category. Pattern elements can then be modified by the operator's ?, *, or +.

? means an element is optional and can occur in the input once or not at all in order for there to be a match.

* means an element can occur zero or more times.

+ means an element can occur one or more times.

Two elements joined with a vertical bar e.g. p|q means either p or q. A whole pattern element can be enclosed in parenthesis which is simply used to indicate how they are grouped. The following are all valid pattern elements:

| | |
|---|---|
| Det | a determiner |
| t? | an optional determiner |
| Det* | zero OR more determiners |
| Det+ | one OR more determiners |
| Det\|NN | a determiner OR a noun |
| (Det*\|NN)? | optionally, zero OR more determiners OR a noun |
| ((Det\|NN) + \|NG) | either one OR more determiners OR nouns (including a mixture), OR a single noun group |

Note that the OR operator has higher precedence than simply two elements in order. This means that if an expression such as "a|b c" is treated as "a followed by c, or b followed by c". If "a alone, or b followed by c" is wanted it must be written as "a|(b c)".

In the grammar rules more than one pattern can be given for a rule. For example, NG(head,mod)=Det?Adj*NN*NN|GER.

is equivalent to:

NG(head,mod)=Det?Adj*NN*NN

NG(head,mod)=Det?Adj*NN*GER

The above rules are given as examples for the purposes of illustrating the point are not the actual rules used.

To see the results of matching an element in a variable, the element is followed by a colon and the name of a variable. This is termed an action. Variables apply only to simply pattern elements, i.e. unit categories. If the entire rule applies i.e. there is a match found between a sequence of elements in the input and the sequence of elements in the rule, then the variables are set to all words which match the corresponding element in their original order. For example:

NG(head,mod)=Det?Adj:mod*NN:head

This defines a noun group NG as an optional determiner followed by zero or more modifying adjectives and a final noun. The adjective words are placed in the variable "mod" and the noun word is placed in the variable "head". The type of variable indicates the type of modification relationship. The "head" variable indicates that the word does not modify any other words in the phrase. The variable "mod" indicates that it is a modifier of the head word.

The same variable can be used on more than one element of the rule, for example:

NG(head, mod)=Det?Adj:mod*NN:mod*NN:head

This results in a number of words being stored in the variable "mod". An example of this in the phrase "the deep blue water". The variables of this phrase are head=water, mod=deep,blue.

A word can be stored in more than one variable if required. For example:

NG(head,mod,adjMod,nounMod)=Det?Adj:(mod,adjMod)*
NN:(mod,nounmod)*NN:head

Thus, the adjective word is stored in two variables mod and adjMod and each of the noun words before the last noun word is also stored as two variables mod and nounMod.

As illustrated in the functional diagram of FIG. 3, the variable are stored at each stage in the processing. In order for the main variables to be used in a subsequent stage it must however be passed to that stage. This can be achieved using the notation new-variable=old-variable where the new variable belongs to the current rule (stage of processing) and the old variable belongs of a previous stage of processing. Any variables which are not copied in this manner are discarded. An example is:

PP(head,pmod,prep)=Prep:prep NG:(pmod=mod,head=head)

This rule states that a prepositional phrase (PP) consists of a preposition followed by a noun group. The preposition word is stored in the variable "prep", the variable "mod" value of the noun group is copied of the variable "pmod", and the "head" variable of the noun group is copied to the "head" variable of the prepositional phrase. If the noun group had any other variables, they would be discarded.

It is possible to copy of all the variables from a later stage of processor to the current stage of processing by using the symbol ^ in the action for the pattern. Such an action causes all the variables in the lower level which have the same name as the variable in the current rule to be copied. Thus the rule given above could be written as:

PP(head,pmod,prep)=Prep:prep NG:(pmod=mod,^)

In addition to there being many types of variables e.g. head, mod, pmod, prep, adjMod, nounMod, variables are used which are indexed. An indexed variable functions like an array for which the index value is a word. In the rules, an indexed variable is declared by following the name of the variable by [ ] in the list of variables. In the body of the rule the expressions of the form var[index]=another-var can be used. The index is the name of a variable from a lower stage of processing of the phrase. An example of where they are needed is in the following rule which combines a noun group with several prepositional phrase modifiers to make a noun phrase:

NP(head,mod,pheads,pmods[ ],preps[ ])=NG:^PP:(pheads=head,
    pmods[head]=pmod,preps[head]=prep)*

This rule illustrates several things. Firstly the "head" and "mod" values of the noun phrase (NP) are copied from those of the noun group (NG) using the ^. Secondly, "pmods" and "preps" are declared as index variables. Both are indexed on the head values of the prepositional phrases. They take their value from the "pmod" and "prep" as variables of the PP's. Finally, the "head" of the pp's are copied into "pheads".

In the above example, the indexing is carried out using the variable generated for the phrase at an earlier stage of processing. It is however also possible to index the variable using a variable generated at the current stage of processing. var{index}=another-var means that the variable var is indexed by the variable "index" generated at the current level of processing and this variable is made equal to "another-var" from an earlier stage of processing. This extra form of indexing allows more flexibility on how the grammar rules are written. For example, prepositional phrases could be indexed on their prepositions, which could be written as:

PP(head[ ],pmod[ ],prep)=Prep:prep

NG(pmod{prep}=mod,head{prep}=head)

Further, by writing var{index} without a following "=another-var", it acts in a similar way to a variable on its own i.e. the word is assigned to var indexed on "index".

Table 6 below summarises the different types of variables which can be used in the grammar rules.

TABLE 6

TABLE OF USES OF VARIABLES

| NOTATION | CATEGORY (cat) MUST BE... | MEANING |
| --- | --- | --- |
| cat:v | lexical | store word in variable v |
| cat:v1 {v2} | lexical | store word in v1 indexed on v2 of rule |
| cat:v1 = v2 | phrasal | copy v2 of previous stage of processing to v1 of current stage of processing |
| cat:v1 [v2] = v3 | phrasal | copy v3 of previous stage of processing to v1 of current stage of processing indexed on v2 of previous stage of processing |
| cat:v1 {v2} = v3 | phrasal | copy v3 of previous stage of processing to v1 of current stage of processing indexed on v2 of current stage of processing |
| ^ | phrasal | copy all variables in common between previous stage of processing and current stage of processing |

GRAMMAR FOR STAGES OF THE FSP

The grammar rules for the stages of the FSP of the embodiment are given hereinafter.

STAGE 1

This stage matches determiner phrases and other "small" initial phrases.

name(head,mod[ ])=(NPO:head)+(num:mod{head})?
    dp(det)=det (num:det)?
    dp(det)=ATO DTO
    dp(det)=PNI PRF
    dp(det)=DPS
    dp(det)=num:det (PRF det)?
    adjp(head,mod[ ])=
      (advj:mod{head})*advj:head((cma|conj|(cma conj))
      (advj:mod{head})*advj:head)+
    adjp(head,mod[ ])=(adv:mod{head})+adj:head
    prepp(prep)=prep:prep (conj prep:prep)+

STAGE 2

This stage matches simple noun groups.

ng(head,vmod[ ], mod[ ],prep[ ])=
      dp:(mod{head}=det)?(NN-VV:rmod{head})?
      ((adv:mod{head}|adjN:mod{head}|
      name:(mod{head}=head, mod=mod)|
      adjp:(mod{head}=head,mod=mod))
      (POS|ppart:mod{head})?)*
      (adjN:head|name:^|adjp:(head=head,mod=mod)|
      NN-VV:head)
    ng(head,vmod[ ],mod[ ],prep[ ]=PNI:head

STAGE 3

This stage matches noun groups with a tight-bound "of" phrase.

ng(head,vmod[ ],mod[ ],
    prep[ ]=(ng:(mod{head}=head,mod=mod) PRF)+ng:^

STAGE 4

This stage matches conjoined noun groups.

ng(head,vmod[ ],mod[ ],prep[ ])=
      ng:^((cma|conj|(cma conj))
      dp:(mod{head}=det)? ng:^)+

STAGE 5

This stage matches a first round of post modified verb phrases with noun group complements.

vmod(head,mod[ ],prep[ ])=
      adv? ger:head ng:(mod{head}=head,mod=mod)+adv?
    vmod(head,mod[ ],prep[ ])=
      rel VVZ:head ng:(mod{head}=head,mod=mod)
    vmod(head,mod[ ],prep[ ])=
      VBG adv? ppart:head ng:(mod{head}=head,mod=mod)

STAGE 6

This stage matches prepositional phrases built from noun groups.

pp(mod[ ], prep)=
      ((adv? prep* prep:prep)|PRF:prep)
      ng: (mod{prep}=head, mod=mod)trail?

STAGE 7

This stage matches verb type post-modifies.

vmod(head,mod[ ],prep[ ])=
      adv? ger:head(prep|prepp)? adv?
    vmod(head,mod[ ],prep[ ])=
      adv? ger:head pp:(prep{head}=prep,mod=mod)+adv?
    vmod(head,mod[ ],prep[ ])=
      (rel VHZ VBN)? adv? ppart:head (prep|prepp)?
    pp: (prep{head}=prep,mod=mod)
    vmod(head,mod[ ],prep[ ])=
      rel VVZ:head pp: (prep{head}=prep,mod-mod)
    vmod(head,mod[ ],prep[ ])=
      VBG adv? ppart:head (prep|prepp)?
    pp:(prep{head}=prep,mod=mod)
    vmod(head,mod[ ],prep[ ])=VV AVO?

STAGE 8

This stage forms noun groups trying to identify combinations such as "pollen covered stamen".

ng(head,vmod[ ],mod[ ],prep[ ])=
      ng:(mod{head}=head,mod=mod,prep=prep)
    ppart:mod{head} ng:^
    ng(headgvmod[ ],mod[ ],prep[ ])=
      ng:^ vmod: (vmod{head}=head,mod=mod,prep=prep)+
      ((cma|conj|(cma conj))vmod:(vmod{head}=head, mod=mod, prep=prep))*

STAGE 9

This stage matches modified noun groups such as "a fire breathing dragon".

ng(head,vmod[ ],mod[ ],prep[ ]=
      ng:^ (vmod:(vmod{head}=head,mod=mod,prep=prep)
      |pp:(prep{head}=prep,mod=mod))+
    ng(head,vmod[ ],mod[ ],prep[ ]=
      ng:^ ng:(mod{head}=head,mod=mod,prep=prep)
      (vmod:(vmod{head})=head, mod=mod,
    prep=prep)ipp: (prep {head}=prep,mod=mod))+

STAGE 10

This stage matches miscellaneous phrases in order to mop up left over words.

sink=trail
    sink=PRP PNP?

STAGE 11

This stage looks for certain modifiers introduced by a comma or conjunction. It is done so that prepositional phrases can be tightly bound into pre-final modifier phrases (pmod).

pmod(mod[ ],prep)=
(cma|conj|(cma conj))sink? pp:^
pp:(mod{prep}=prep, mod=mod)?

STAGE 12

This stage matches top level combinations.

top(head,vmod[ ],mod[ ],prep[ ])=
ng:^sink? (((cma|conj|(dma conj))(ng:^|vmod:
(vmod{head}=head, mod=mod, prep=prep)))|pmod:
(prep{head}=prep, mod=mod)|pp: (prep{head}=prep,
mod=mod))* sink?

top(head,vmod[ ],mod[ ],prep[ ])=
ng:^ rel DTQ ng:^ be VVG:mod{head} top(head,vmod[ ],mbd[ ],prep[ ])=ng:^ sink ng:^ top(head,vmod[ ],mod[ ],prep[ ])=
ng:^ pp:(prep{head}=prep, mod=mod) ng:^ top(head,vmod[ ],mod[ ],prep[ ])=
pp:^ (pp:^|vmod: (vmod{head}=head, mod=mod,prep=prep)
|pmod:(prep{head}=prep, mod=mod))*

STAGE 13

This is the final stage that mops up any start and any tokens (anchors) and punctuation.

top(head,vmod[ ],mod[ ],prep[ ]=
anchor top:^ PUN? anchor

METHODS OF STORING INDEXED VARIABLES

Because the parsing process operates on the input natural language from left to right, indexed variables cannot be generated and stored simply by stepping through the process. For example, the head word used as an index may not appear until the end of the phrase, whereas the variable to be indexed by the head word is determined before it i.e. it is on the left of it. Thus, indexing of the variables cannot take place until all of the variables are determined for the phrase.

There are two ways in which the parser can be implemented in order to generate indexed variables.

FIRST IMPLEMENTATION

Figure 4:
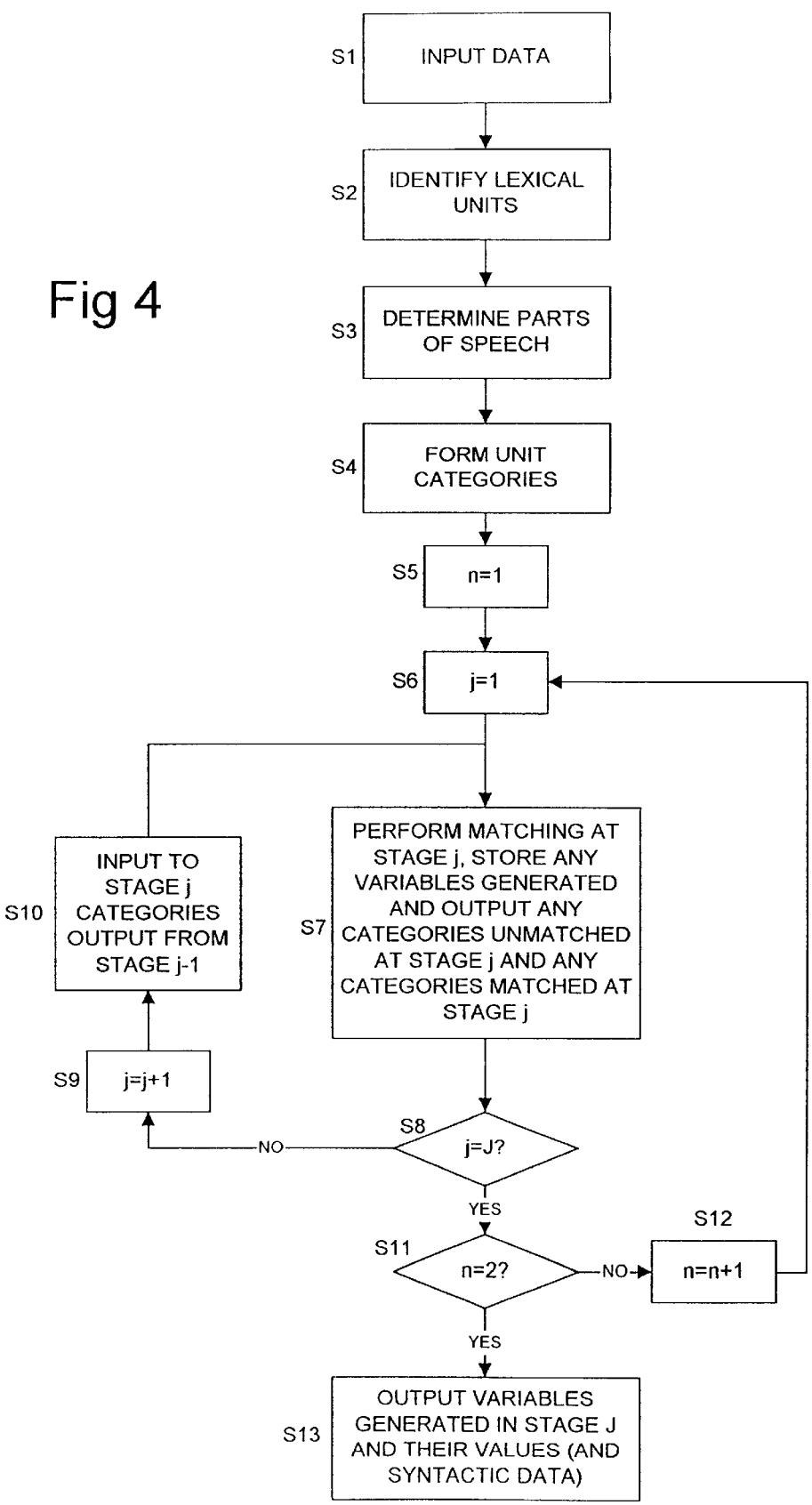
FIG. 4 is a general flow diagram of a first method of the present invention.

FIG. 4 illustrates a first implementation wherein the parser is implemented twice. On a first parsing process (when a variable n is set to 1) non indexed variables are generated. Indexed variables are then generated using the non indexed variables on a second implementation of a parser (when the variable n is set to 2).

FIG. 4 is a flow diagram illustrating this process for a FSP having J stages. In step S1 data is in input in a natural language e.g. a phrase or sentence. The lexical units are then identified using a lexical processor in step S2 and in step S3 the parts of speech are determined. These are used to form unit categories in step S4 which are then input into the parsing process. An initialisation of the parsing process occurs in step S5 wherein the counter n is set to 1. n is used to count the number of implementations the parser has carried out. In step S6 the processing stage counter j is set to 1 to select the first stage in the processing.

In step S7 the finite state matching process starts by performing the matching at stage j. Any generated non-indexed variables are stored when n=1 or indexed a variables are stored when n=2. Also, in step S7 any categories unmatched at stage j and any categories matched at stage j are output. In step S8 it is then determined whether all of the stages of the finite state parser have been implemented, j=J where J is the number of stages in the finite state parser. If not, the stage counter j is incremented in step S9 and in step S10 the input to the next stage is the output from the previous stage and the process returns to step S7. Thus steps S7 to S10 comprises a loop which is implemented J times for all of the stages until the finite state parser has been implemented.

Once all of these stages have been implemented i.e. j=J, in step S11 it is determined whether n=2 i.e. whether the parsing process has been carried out twice. If not, in step S12 the parsing process counter n is incremented and the process returns to step S6. Thus in this embodiment a first parsing process is carried out to generate non indexed variables e.g. heads, and the process is repeated in order to generate indexed variables.

Once the two pass parsing process is completed in step S13 the variables generated at stage J are output together with their values and syntactic data.

The details of the operation carried out in step S7 will now be described in more detail with reference to FIG. 5. In this figure i indicates sequence of categories i=1 . . . I where categories are lexical i.e. unit categories and have a word associated with them, or phrasal i.e. group categories and have a set of variables associated with them. The sequence of categories comprise the input to a stage of finite state parser. The output comprises a new sequence of lexical and phrasal categories. Within a stage of the finite state parser there are F finite state machines indexed by f i.e. f=1 . . . F.

In step S20 the sequence counter i is set to 1. In step S21 the finite state machine counter f is set to 1. In step S24 the finite state machine f is tried started at the input word or phrase i. If the finite state machine fails i.e. there is no match found starting at the category i, in step S22 the finite state machine is incremented and in step S24 it is determined whether the last finite state machine has been reached. If not the process returns to step S22 to try again. If the last finite state machine has been tried, in step S25 the category in the sequence is output unchanged from the input. In step S26 the sequence counter i is then incremented and in step S27 it is determined whether the end of the sequence of categories has been reached. If so, in step S28 the process for stage j has finished. If in step S27 the last of the categories in the sequence has not been processed, the process returns to step S21.

If in step S22 a match is found and the finite state machine is able to perform a transition, in step S29 the phrasal category for the finite state machine f is output and when n=1 i.e. for the first finite state parsing pass through, non-indexed variables are stored and when n=2 i.e. for the second finite state parsing pass indexed variables are stored. Then in step S30 the sequence counter i is incremented or updated to the input item after the last one recognised by the finite state machine f. The process then proceeds to step S27 where it is determined whether the sequence counter i has reached the end of the sequence i.e. i=I. If not the process returns to step S21 and otherwise in step S28 it is determined that the processing for stage j has finished.

The details of the steps carried out in step S22 of FIG. 5 will now be described in detail with reference to FIG. 6. The finite state machine f is made up of states and transitions. The state that the machines currently use is tracked and variables are output together with the phrasal category. The finite state machine f operates by incrementing through the sequence of categories i. s is the current state.

In step S40 S is set to the start state. In step S41 it is determined whether there is a transition from the state s to a new state t using the category of item i. If so, in step S42 when n=1 any non-indexed variable for the transition is stored. When n=2 any indexed variable for the transition is stored. In step S43 the state s is set to the new state t and the sequence counter i is incremented. In step S44 it is determined whether the end of the sequence of categories has been reached. If not the process returns to step S41. If the end of the sequence of categories has been reached the process proceeds to step S45 where it is determined whether s is a final state. If not, the process is indicated to have failed in step S47. Otherwise in step S46 the process is determined to have succeeded.

If in step S41 it is determined that there is no transition from the current state s to a new state t using the category of item i, the process proceeds to step S45 where it is determined whether s is a final state. If so, the process is indicated as having succeeded in step S46 and if not the process returns is indicated as having failed in step S47.

SECOND IMPLEMENTATION

Figure 7:
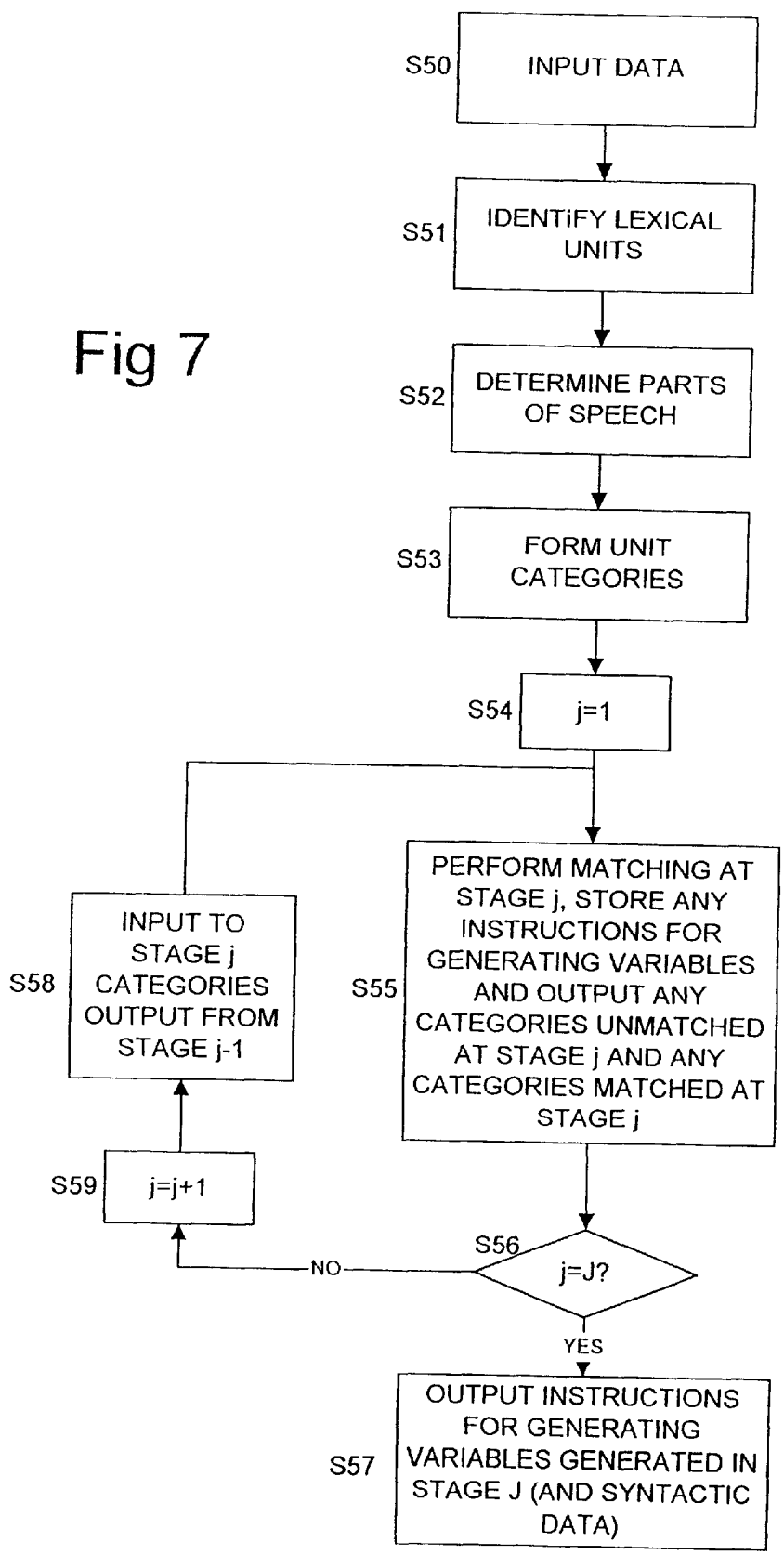
FIG. 7 is a flow diagram of a second method of the present invention.

FIG. 7 is a flow diagram of a second implementation in which instead of carrying out a two pass parsing operation, during a single parsing operation the variables are stored together with instructions for indexing them.

In step S50 data is input in a natural language and in step S51 the lexical processor identifies lexical units. In step S52 parts of speech are determined and in step S53 unit categories are formed. In step S54 the processing stage counter j is set to one to start at the first stage. In step S55 the finite state parsing process is implemented by performing matching at stage j and storing any instructions generating variables for that stage. Also, any categories unmatched at stage j and any categories matched at stage j are output. In step S56 it is then determined whether the final stage of the finite state parser has been reached i.e. j=J, where J is the number of stages in the finite state parser. If not in step S57 the stage counter j is incremented and in step S58 the input to the current stage j is selected as the categories from the output of the previous stage j−1. The process then returns to step S55. Thus steps S55 to S58 are repeated J times for each of the stages in the finite state parser.

If the final stage of the finite state parser has been implemented i.e. j=J in step S56, in step S57 the instructions for generating the variables is generated in step J are output together with the syntactic data.

Figure 8:
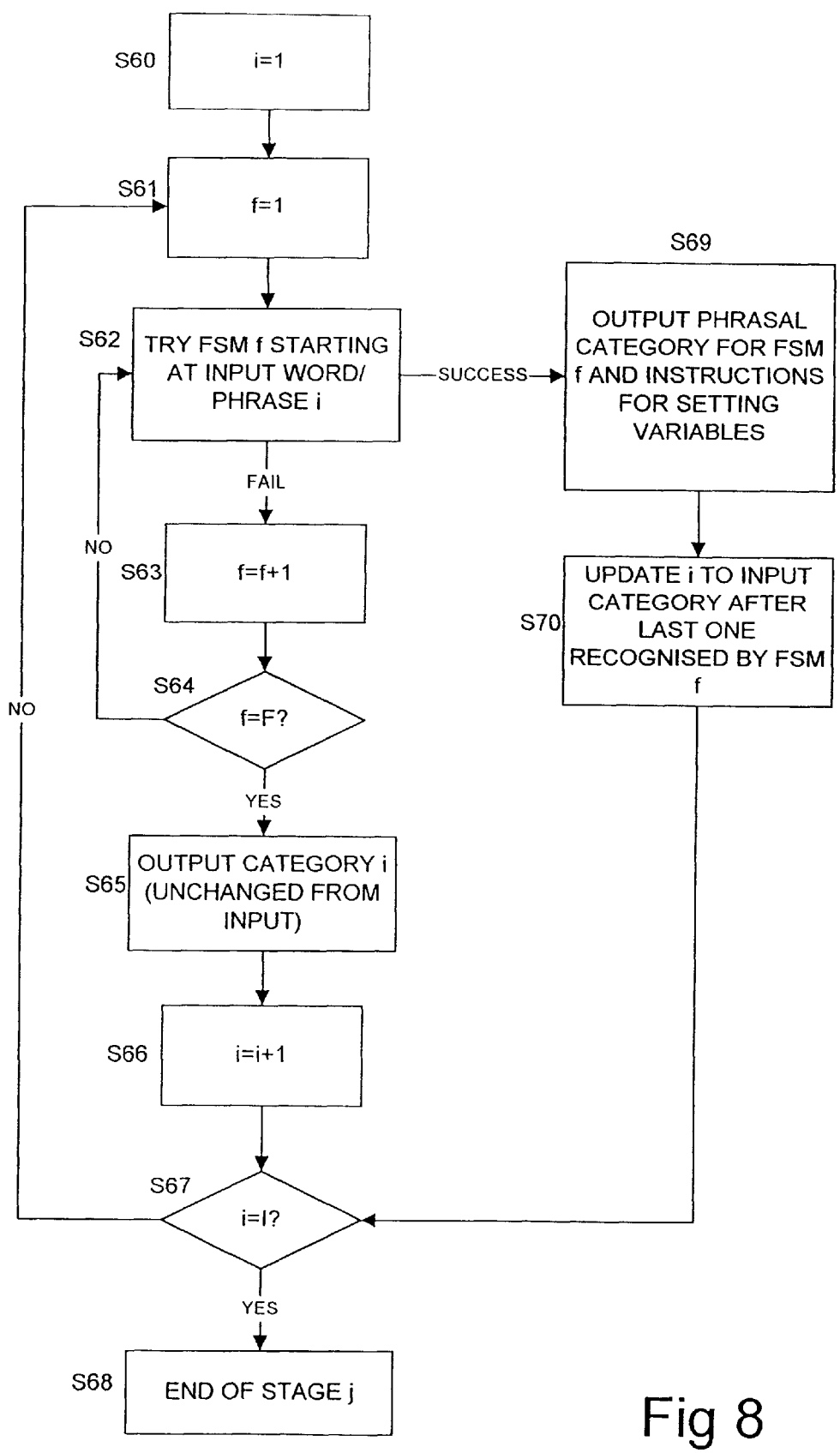
FIG. 8 is a flow diagram detailing the steps of step S55 in FIG. 7.

Details of the steps to performed in step S55 of FIG. 7 will now be described in detail with reference to FIG. 8. This describes the operation of a single finite state parser stage which has an input of a sequence of category i from 1 to I. Categories are lexical i.e. unit categories and have a word associated with them, or phrasal i.e. group categories and have a set of variables associated with them. The output is a new sequence of lexical and phrasal categories. Within this stage there are F finite state machines which are indexed by f=1 . . . F.

In step S60 the category sequence index i is set to 1 and in step S61 the finite state machine counter j is set to 1. In step S62 the finite state machine f is tried starting at the input word or phrase i. If it fails i.e. no match is found, in step S63 the finite state machine counter f is incremented. In step S64 it is then determined whether all the finite state machines have been tried i.e. f=F. If not the process returns to step S62.

If all the finite state machines have been tried, in step S65 the category indexed by the sequence counter i is output unchanged from the input. In step S66 the sequence counter is then incremented and then in step S67 it is determined whether all of the sequence of categories have been processed i.e. i=I. If so, in step S68 it is determined that the processing stage j has been completed. If all of the sequence of categories has not been processed the process returns to step S61.

If in step S62 in the finite state machine f is tried starting at the input word or phrase i and succeeds i.e. a match is found, in step S69 the phrasal category for the finite state machine f is output together with instructions for setting the variables. In step S70 the sequence counter i is then updated to the input category after the last one recognised by the finite state machine f. Then in step S67 if it is determined whether the final category in the sequence has been reached i.e. i=I. If so in step S68 is determined that the processing for the stage j has finished. If not the process returns to step S61.

Figure 9:
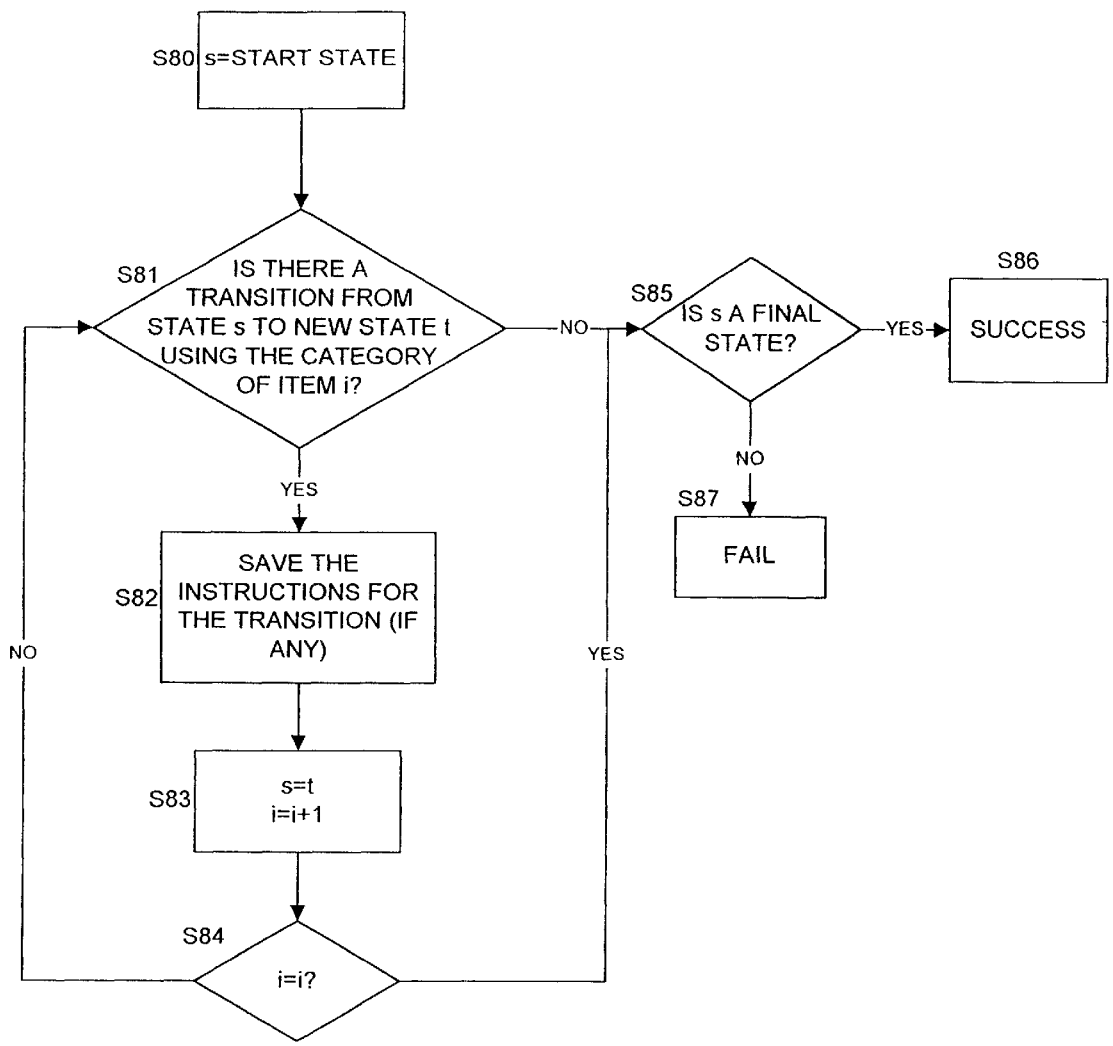
FIG. 9 is a flow diagram detailing the steps of step S62 in FIG. 8.

Details of the steps carried out in step S62 of FIG. 8 will now be described in detail with reference to FIG. 9.

A finite state machine is made up of states and transitions. The state that the finite state machine is tracked together with the output instructions for setting the variables and the phrasal category. s is the current state.

In step S80 the current state s is set to the start state. In step S81 it is determined whether there is a transition from the state s to a new state t using the category of item i. If so, in step S82 the instructions for transitions (if any) are saved. In step S83 the finite states is then updated to the new state t and the sequence counter is incremented. In step S84 it is then determined whether the end of the sequence has been reached i.e. i=I and if not the process returns to step S81. If the end of the sequence has been reached, the process proceeds to step S85 where it is determined whether the finite state machine is in a final state. If so, the process terminates indicating success in step S86 and if not, the process terminates indicating failure in step S87.

In step S81 if there is no transition from state s to the new state t using the category of item i, the process proceeds to step S85 where is determined whether the final state of the finite state machine has been reached. If so, the process terminates indicating success in step S86 and if not, the process terminates indicating failure in step S87.

Figure 10:
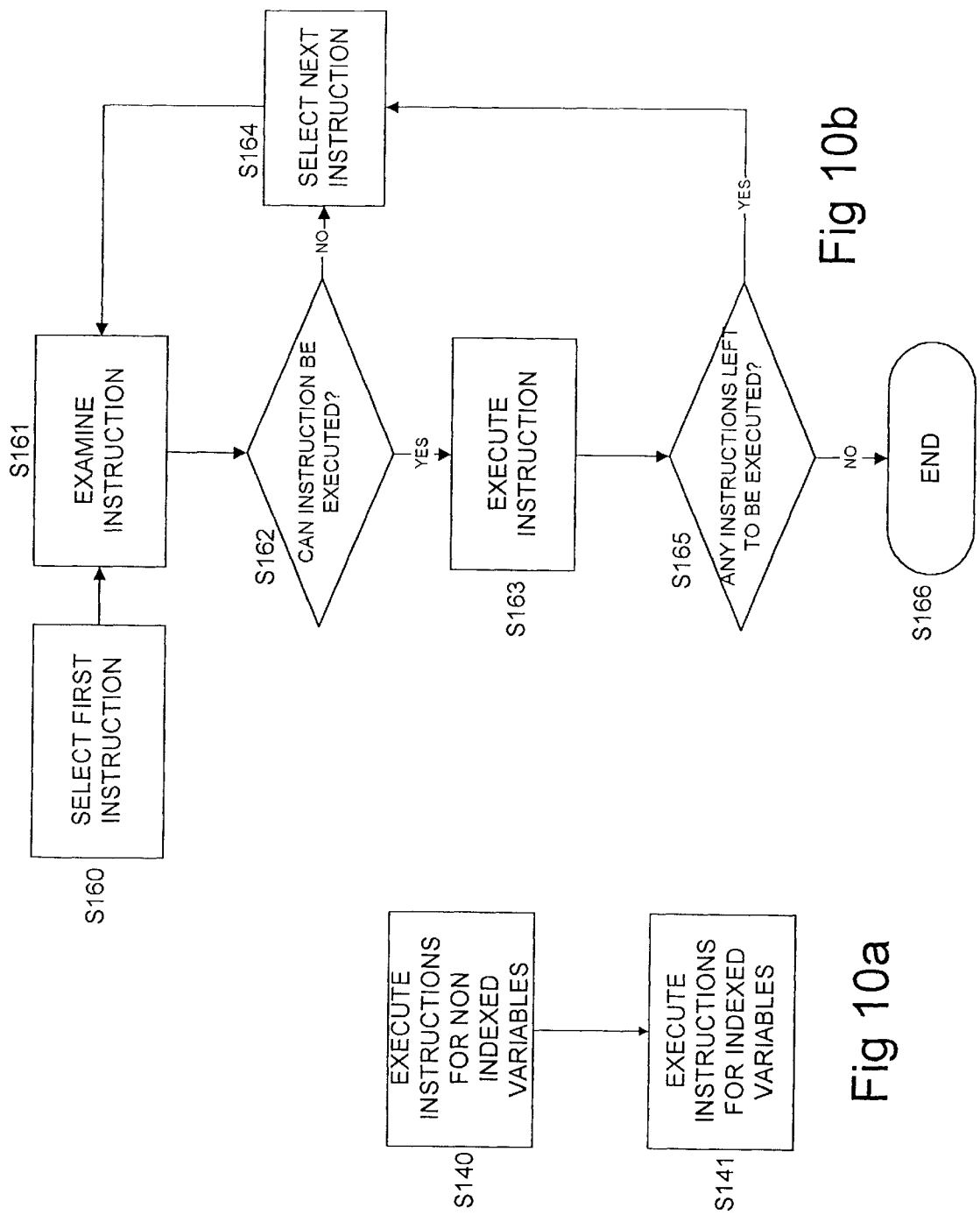
FIGS. 10a and 10b illustrate alternative methods of implementing the indexing instructions of the method of FIG. 7.

There are several ways in which the instructions for indexing the variables can be executed. FIG. 10a and 10b illustrate alternative methods.

In FIG. 10a, the instructions for non-index variables are first implemented in step S140 followed by instructions for indexed variables in step S141.

In FIG. 10b, a first instruction is selected in step S160 and in step S161 this is examined. In step S162 it is determined whether this instruction can be executed, i.e. whether the indexing variable is available. If not, in step S164 the next instruction is selected and the process returns to step S161. If the instruction can be implemented, in step S163 it is implemented and in step S165 it is then determined whether there are any instructions left to be executed. If so the process returns to step S164. Otherwise the process terminates in step S166.

EXAMPLE OF A PARSED PHRASE

Example of the variables and syntactic data generated by the parser will now be illustrated with reference to an example input phrase "big red car in the street" in the English language.

SYNTACTIC STRUCTURE

| TEXT | big | red | car | in | street |
|---|---|---|---|---|---|
| Tags for parts of speech | AJO | AJO | NN1 | PRP | NN1 |
| Tags after tag fixing | AJO | AJO | NN | RPR | NN |
| Alias tags | advj | advj | adjN | prep | adjN |
| Step 1 (stage 1) | [big | red]$_{adjP}$ | | | |
| Step 2 (stage 2) | [[big | red]$_{adjP}$ | car]$_{NG}$ | | [street]$_{NG}$ |
| Step 3 (stage 6) | | | | [in | [street]$_{NG}$]$_{PP}$ |
| Step 4 (stage 12) | [[[big | red]$_{adjP}$ | car]$_{NG}$ | [in | [street]$_{NG}$]$_{PP}$]$_{TOP}$ |

Figure 11:
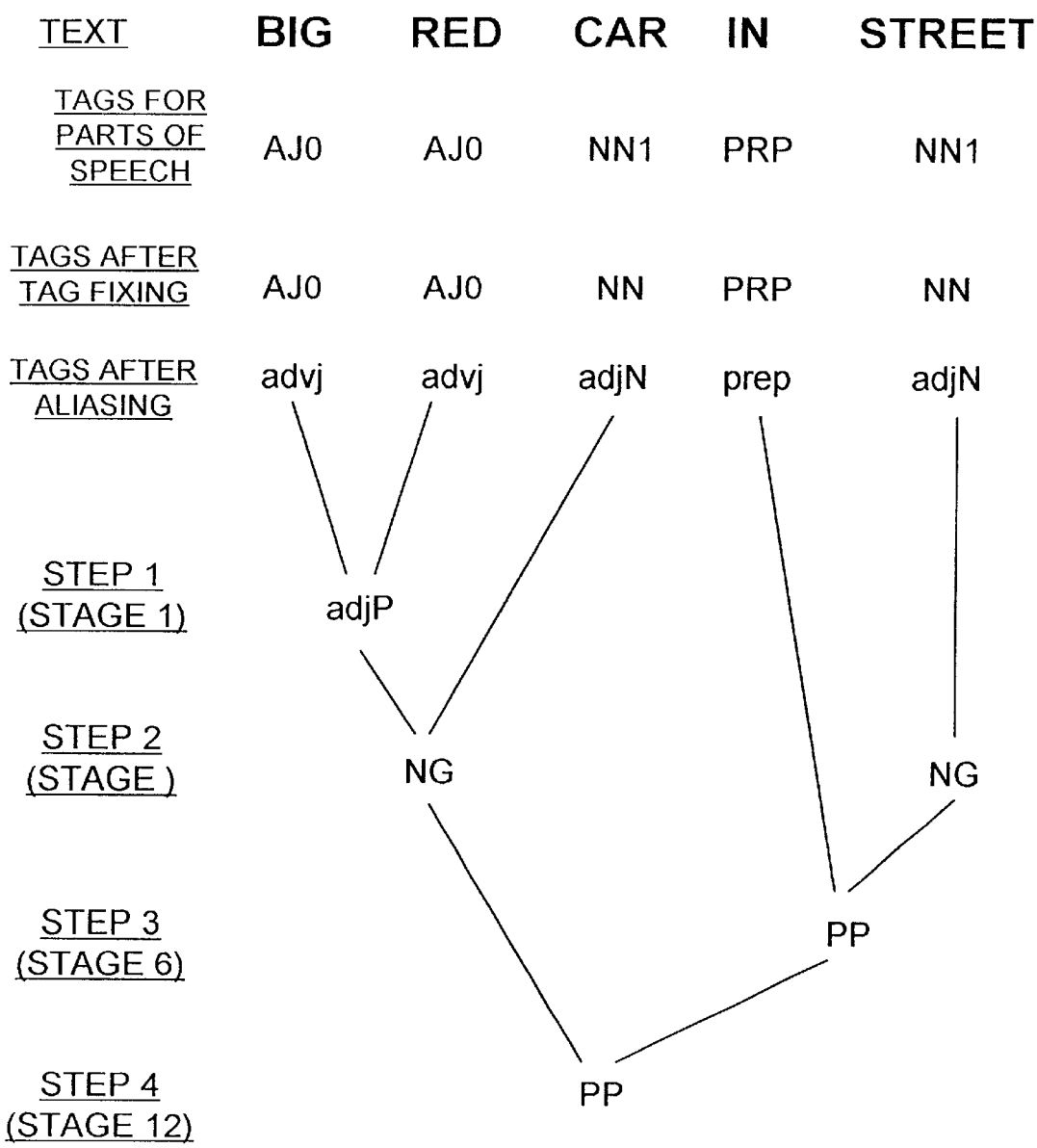
FIG. 11 illustrates the processing steps carried out in the processing of a particular natural language input.

The above and FIG. 11 illustrates the syntactic structure in which unit categories are grouped together to form group categories. As a first step which is carried out in stage 1 of the parser the adjectives "big" and "red" are identified as comprising an adjective phrase (adjP). In the second step in the parsing process carried out by stage 2 of the parser the adjective phrase "big red" and the noun "car" is recognised as the noun group and thus the group category noun group (NG) is generated. Also the word "street" is recognised as a noun group (NG). In step 3 which is carried out by stage 6 of the parser the preposition "in" and the noun group "ostreet" is recognised as forming a prepositional phrase (PP). In step 4 of the processing which is carried out by stage 12 of the parser, the noun group (NG) and prepositional phrase (PP) are recognised as forming a top level group (TOP).

Tables 7 and 8 given below illustrate how the variables are determined at each stage for this example.

TABLE 7

VARIABLE DETERMINATIONS

| STEP | GROUP | VARIABLES USED | VARIABLE VALUES |
|---|---|---|---|
| 1 (Stage 1) | adjP | advj:head<br>advj:mod{head} | head = red<br>mod[red] = big |
| 2 (Stage 2) | NG | adjN:head<br>adjP:(mod{head} = head, mod = mod) | head = car<br>mod[car] = red<br>mod[red] = big |
| | NG | adjN:head | head = street |
| 3 (Stage 6) | pp | prep:prep<br>ng: (mod{prep} = head, mod = mod) | prep = in<br>mod[in] = street |
| 4 (Stage 12) | top | ng:^<br><br>pp:<br>(prep{head} = prep, mod = mod) | head = car<br>mod[car] = red<br>mod[red] = big<br>prep[car] = in<br>mod[in] = street |

VARIABLES DETERMINED FOR EACH CATEGORY

TABLE 8a

| Text | big | red | car | in | street |
|---|---|---|---|---|---|
| Tags | advj | advj | adjN | prep | adjN |

VARIABLES DETERMINED FOR EACH CATEGORY

TABLE 8b
STEP 1

| Text | Category | Variables |
|---|---|---|
| [big red] | adjp | head = red, mod[red] = big |
| car | advN | — |
| in | prep | — |
| street | adjN | — |

TABLE 8c
STEP 2

| Text | Category | Variables |
|---|---|---|
| [[big red]car] | NG | head = car, mod[car] = red, mod[red] = big |
| in | prep | — |
| [street] | NG | head = street |

TABLE 8d
STEP 3

| Text | Category | Variables |
|---|---|---|
| [[big red]car] | NG | head = car, mod[car] = red, mod[red] = big |
| [in [street]] | PP | prep = in, mod[in] = street |

TABLE 8e
STEP 4

| Text | Category | Variables |
|---|---|---|
| [[[big red]car] [in street]] | TOP | head = car, mod[car] = red, mod[red] = big, prep[car] = in, mod[in] = street |

In the first stage in the adjective phrase "big red" the variables head=red and mod[red]=big are identified.

In the second stage in the noun group the variables head=car, mod[car]=red and mod[red]=big are identified and in the noun group "street" the variable head=street is identified.

In the third processing step the variables for the noun group "big red car" are identified as head=car, mod[car]=red and mod[red]=big are stored and for the prepositional phrase "in street" the variables prep=in and mod[in]=street are generated.

In the final processing step for the complete phrase the variables head=car, mod[car]=red, mod[red]=big, prep [car]=and mod[in]=street are stored.

Variables are stored locally at each stage and locally to each phrasal category. Variables which are not used by subsequent stages in the processing are ignored e.g. head= red in step 1 and head=street in step 3 above (the variables are not used in subsequent step but their values are copied i.e. the value red is given to the variable mod[car] and the value street is given to the variable mod[in].)

Figure 12:
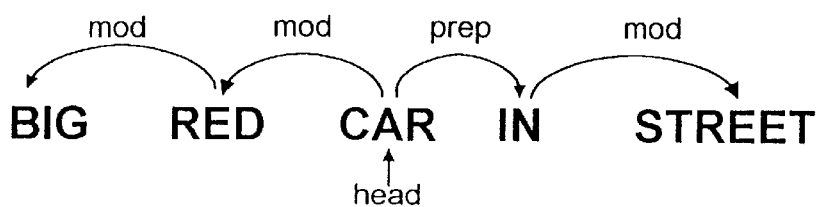
FIG. 12 is a schematic illustration of the variables generated from the parsing of the input natural language of the example of FIG. 11.

The variables given above can clearly be shown to define the modification relationship in the input data. It can be seen that the variables not only define which words modify other words, but also the type of modification relationship. The type of modification relationship is defined by the type of variable. This is illustrated diagrammatically in FIG. 12. This illustrates that the variables define the links between the words in the phrase.

EXAMPLE OF A PARSED PHRASE WITH AMBIGUITY

The use of indexed variables is able to handle the occurrence of ambiguities in the meaning of input phrases. For example, in the phrase "man with a dog holding a big stick" there is ambiguity as to whether the man is holding the big stick or the dog is holding the big stick.

The ambiguity can be handled in the parsing process by writing the grammar rules so that variables which require indexing in two separate phrases within the input data are not initially indexed at the stage of processing which generates the variable but are instead indexed later in the processing stages.

The grammar rules that can be used for parsing the above input data are given below.

Step 1
PP (prep,pmod)=Prep:prep Det? NN:pmod
Step 2
RC (rhead, obj, mod[ ])=Ger:rhead Det?
   adj:mod{obj}NN:obj
Step 3
NP (head,prep[ ], pmod[ ], mod[ ], obj[ ]_X)=
Det? NN:head PP:(prep{head}=prep,
pmod[prep]=pmod, _X=pmod RC:
(mod{head}=rhead, obj[rhead]=obj, mod=mod,
modf{_X}=rhead)

Figure 13:
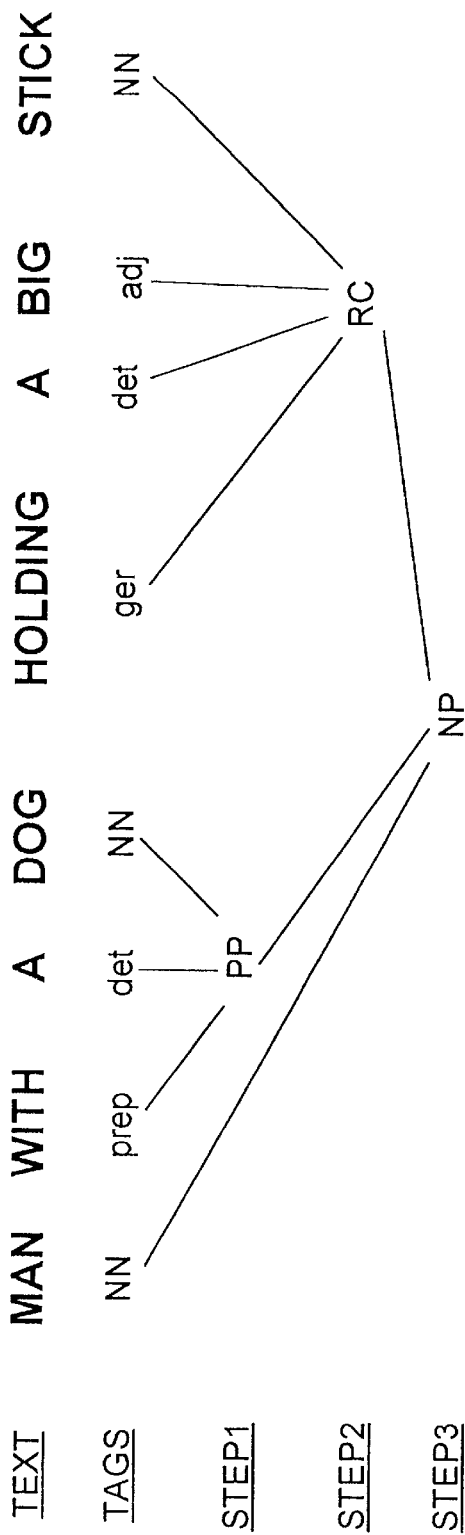
FIG. 13 is an illustration of the processing of an input natural language example which includes an ambiguity.

These grammar rules can be used to perform parsing which results in the syntactic structure:

man with a dog holding a big stick
Tags NN prep det NN Ger det advj NN
Step 1
[with a dog]$_{PP}$
Step 2
[holding a big stick]$_{RC}$
Step 3
[man[with a dog]$_{PP}$ [holding a big stick]$_{RC}$]$_{NP}$ This syntactic structure is also illustrated in FIG. 13. In step 1 the prepositional phrase "with a dog" is first identified to generate the group category PP. In the next step the relative clause "holding a big stick" is identified to generate the group category RC. In the final step the prepositional phrase PP, the relative clause and the noun of the input data is identified as a noun phrase and thus the group category NP is generated.

Table 9 below illustrates how the variables are determined for this example.

TABLE 9

VARIABLE DETERMINATIONS

| Step | Group | Variables Used | Variable Values |
|---|---|---|---|
| 1 | PP | Prep:prep | prep = with |
|   |   | NN:pmod | pmod = dog |
| 2 | RC | Ger:rhead | rhead = holding |
|   |   | adj:mod{obj} | mod[stick] = big |
|   |   | NN:obj | obj = stick |
| 3 | NP | NN:head | head = man |
|   |   | prep{head} = prep | prep[man] = with |

TABLE 9-continued

VARIABLE DETERMINATIONS

| Step | Group | Variables Used | Variable Values |
|---|---|---|---|
|   |   | pmod[prep] = pmod | pmod[with] = dog |
|   |   | _X = pmod | _X = dog |
|   |   | mod{head} = rhead | mod[man] = holding |
|   |   | obj[rhead] = obj | obj[holding] = stick |
|   |   | mod = mod | mod[stick] = big |
|   |   | mod{_X} = rhead | mod[dog] = holding |

It can be seen in this example that in the first step the variables prep and pmod are not indexed. In the final stage indexing of these variables takes place by referring back to the variables generated in step 1. The variable pmod[prep]= pmod is used to perform the indexing of the variable content dog and indexed with. Also, by using the variable _X=pmod, the word dog can be passed from the variables used in the PP phrase to the variables used in the RC phrase so that the variable mod{_X}=rhead results in the variable mod[dog]=holding.

Figure 14:
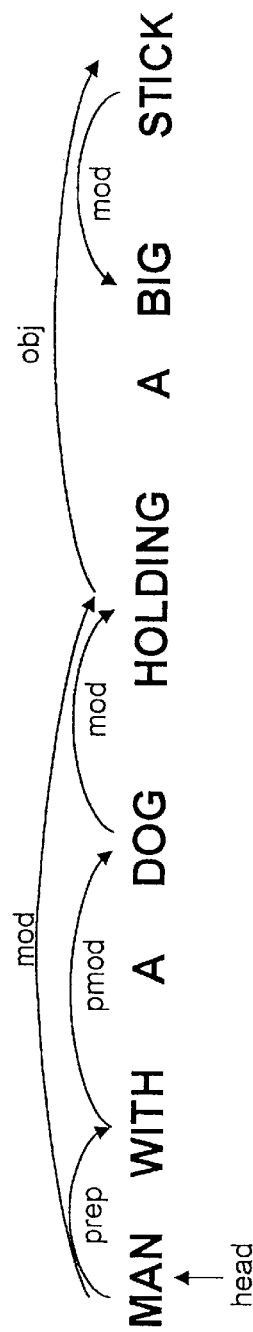
FIG. 14 is a schematic illustration of the generated variables for the input natural language of FIG. 13.

FIG. 14 illustrates the modification relationship given by the variables in Table 9. As can be seen there is ambiguity as to whether the man is holding the big stick or the dog is holding the big stick. This is dealt with by providing two modification relationships from the head "man" resulting in two modification relationships on the relative head "holding".

It can be seen from this that complex semantic information can be obtained using the indexed variables to identify complex modification relationships.

THE MATCHING PROCESS

The output of the parsing process which comprises data in computer usable form can be used to generate an output signal for controlling a device. As illustrated in FIG. 1, the output signal generator includes a data base of input/output signals. This data base contains a set of data comprising patterns of data to which the input data is to be matched and the output signal resulting if a match is found. For example, the data base could contain the phrase "switch on the light" and. the control module can comprise a light unit. Thus when the input phrase matches the meaning, the output signal generated causes the desired result. The data base can thus either store the reference data which will then require parsing or it can store the parsed data in the form of variables so that this can be compared directly with the data output from the parser.

The principles of the matching technique have been described in detail in the applicant's earlier U.S. application Ser. No.: 09/400,872 the content of which is hereby incorporated by reference.

The principle of the matching technique is to identify the head of the input data and the head of the reference data in order to compare them. Each of the modifiers can then be compared together with their modification relationships so that heads and modifiers are aligned and compared in an iterative manner.

Although in the parsing method described hereinabove the unit data comprises words, the technique is not limited to the use of words. Any type of unit can be used such as a lexical unit, or a meaning representation for a word or group of words which provides a more robust matching technique.

Figure 15:
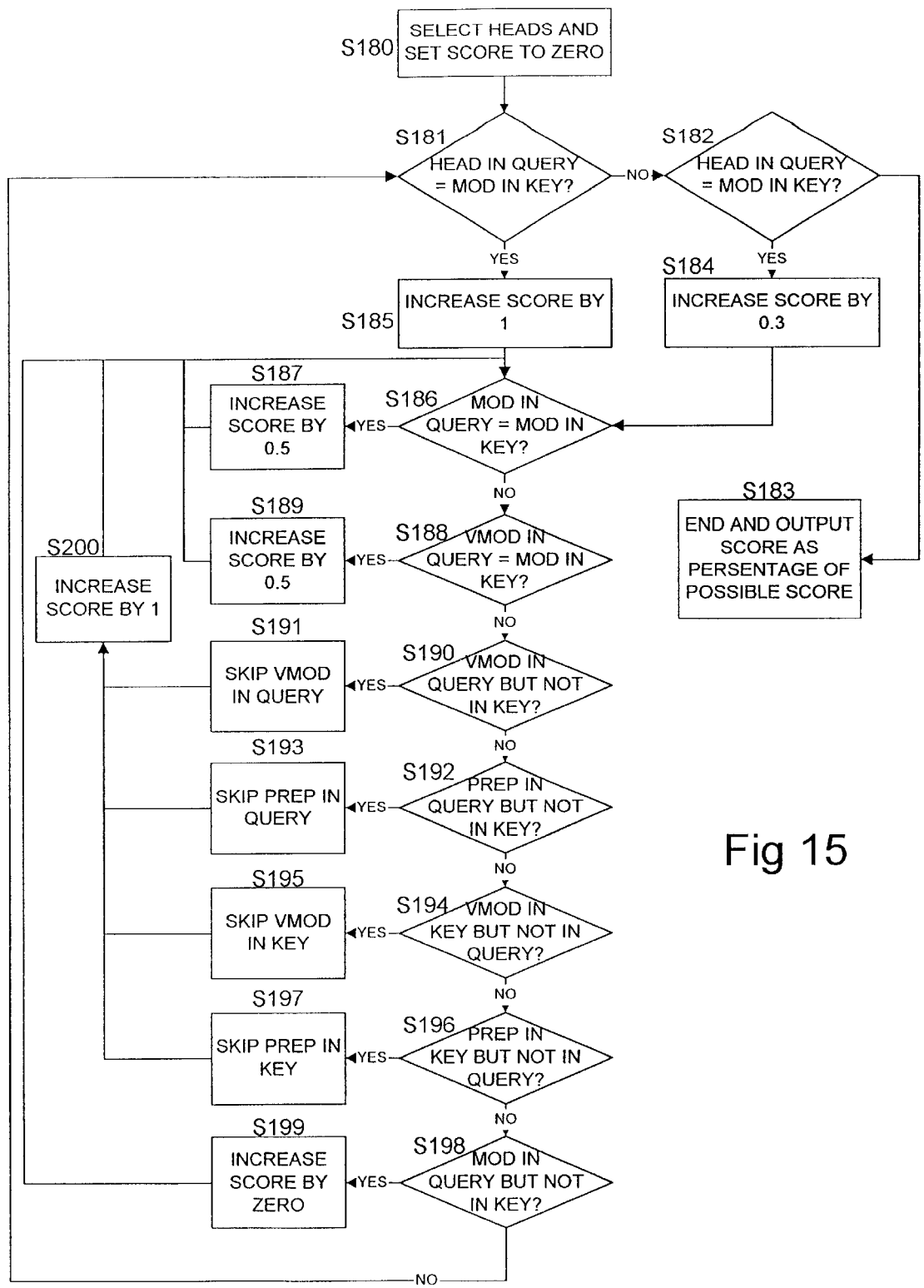
FIG. 15 is a flow diagram of the process of matching the variable data for a query and a key in accordance with an embodiment of the invention.

FIG. 15 is a flow diagram of the matching process. In step S180 the heads in the input data (query) and the reference data (key) are selected and a score for the match is set to zero. In step S181 it is determined whether the head in the query matches the head in the key. If not, in step S182 it is determined whether the head in the query matches a modifier in the key. If not, the matching process has failed and the matching process terminates in step S183 with the output. The score is output as the accumulated score divided by the highest possible score for the query. If in step S181 it is determined that the heads match, the score is increased by one in step S185 and in step S186 it is determined whether the modifier in the query matches the modifier in the key. If in step S182 it is determined that the head in the query equals a modifier in the key. In step S184 the score is increased by 0.3 and the process proceeds to step S186. If in step S186 it is determined that the modifiers match, in step S187 the score is increased by 0.5 and the process returns to step S186. If in step S186 it is determined that the modifiers do not match, in step S188 it is determined whether the variables vmod in the query and the key match. If so, the score is increased by 0.5 in step S189 and the process returns to step S186. If in step S188 it is determined that the vmod variables do not match, it is determined whether there is a variable vmod in the query in step S190 that does not match a vmod in the key. If this is so, in step S189 the vmod in the query is skipped and the score is increased by 1 in step S200. The process then returns to step S186. If in step S190 there is no vmod variable to be skipped, it is determined whether there is a prep variable in the query in step S192 which does not match a prep variable in the key and if so in step S193 the prep variable is skipped and the score is increased in step S200 by 1. The process then returns to step S186. If in step S192 it is determined that there is no prep variable in the query which can be skipped, in step S194 it is determined whether there is a vmod variable in the key with no corresponding vmod variable in the query. If so, in step S195 the vmod variable is skipped in the key and in step S200 the score is incremented by 1. The process then returns to step S186. If in step S194 it is determined that there is no vmod variable in the key to be skipped, in step S196 it is determined whether there is a prep variable in the key which can be skipped. If so in step S197 the prep variable is skipped in the key and in step S200 the score is incremented by 1. The process then returns to step S186. If in step S196 it is determined that there is no prep variable which can be skipped in the key, in step S198 it is determined whether there is a mod variable in the query for which there is no corresponding mod variable in the key. If so, the score is not increased in step S199 and the process then returns to step S181. If there are no modifiers left, in step S198 the process returns to step S181 to look for new heads.

An example of the matching process will now be described.

If the query is "big green car" the variables are head=car, mod[car]=green and mod[green]=big. If the key is "big car" and the variables are head=car and mod[car]=big.

The result of step S181 is that the heads "car" match and thus the score is increased by 1. There is no modifier in the key which matches "green" in the query and thus step S198 causes the score not to be increased. Then in step S186 it is determined that the modifier "big" can be matched in the query in the key and thus the score is increased by 0.5. The total score is thus 1.5. This is then divided by the total possible score for the matches which is 2.5 giving a match of 60%.

A threshold for the score can thus be set whereby if the threshold is met, the match is deemed to be good enough to result in an output.

The matching process can be used for many applications. One particular use for applications is in the retrieval of data from a data base e.g. images which have natural language captions. The captions form the key and input data comprises a query. The resultant output data comprises the best match or matches for the keys to the query. The controlled module in FIG. 1 can thus comprise a display on a computer to display the best matches e.g. for images the display can comprise a number of displayed images.

IMPLEMENTATION OF THE GRAMMAR RULES AS A FINITE STATE MACHINE

Figure 16:
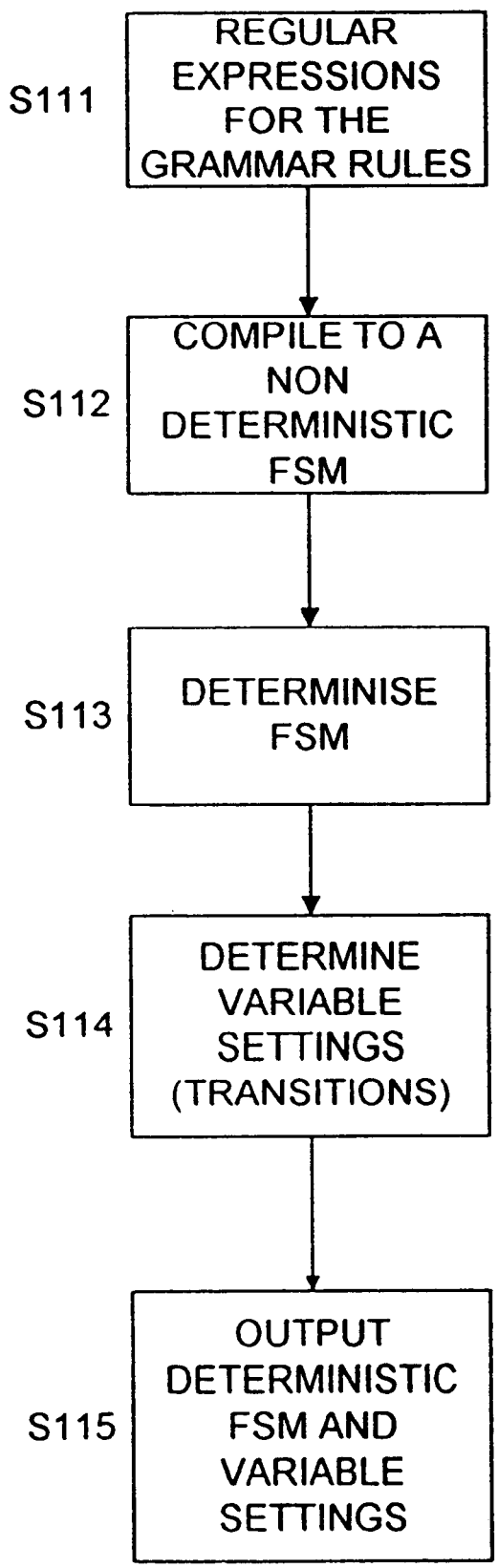
FIG. 16 is a flow diagram of the steps carried out in forming the finite state machine from grammar rules.

FIG. 16 is a flow diagram of the method of designing the finite state parser. The grammar is developed and the grammar rules are then written as regular expressions by a developer. In step S111 the regular expressions are input e.g. using a keyboard or from a stored file. The regular expressions are then compiled to a non-deterministic finite state machine in step S112. This will be described in more detail hereinafter. Although the non-deterministic finite state machine can be used, problems can occur with the following example pattern:

$$X{:}a^*X{:}b \; (X{:}c)^*$$

A non-deterministic finite state machine could result in the parsing of the X's in many different ways. Thus "XXX" could parse with the first two X's being placed in a and the third in b, or with one in a, one in b and one in c, and so on.

In order to avoid this problem and also make the implementation faster, in step S113 the finite state machine is determinised. This will be described in more detail hereinafter.

In step S114 the variable settings i.e. transitions are then determined and in step S115 the deterministic finite state machine and the variable settings are output. This comprises the finite state parser data stored in the memory (6) in FIG. 1.

COMPILING REGULAR EXPRESSIONS TO A NON-DETERMINISTIC FINITE STATE MACHINE

FIGS. 17a to 17e illustrate the compilation algorithm. In these diagrams 100 comprises a state including a start state and 110 is a final state. Transitions occur between the states. The transitions can consume an item matching p from the input and cause an action a to happen if the entire pattern is matched. The action may be omitted in which case e indicates an empty transition between states. These transitions can be followed without consuming any input or causing any actions.

Figure 17A:
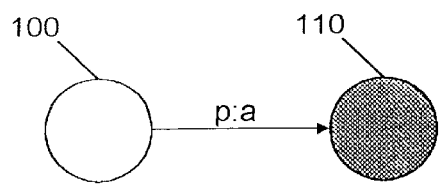
FIGS. 17a to 17e illustrate the compilation of stages in the construction of the finite state machine from the grammar rules.

The term "N(r)" is used to mean the finite state machine which results from compiling the regular expression r. Boxes are used with just the start and end states to mean the result of a previous stage of compilation, with new transitions and states added on. For a basic element (category, word or category/word), p optionally with action a, the finite state machine transition N(p:a) is illustrated in FIG. 17a.

Figure 17B:
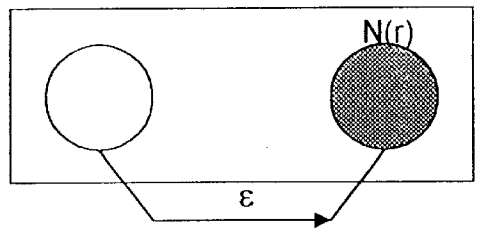

If r is an element, the finite state machine for N(r?) is constructed from N(r) using FIG. 17b.

Figure 17C:
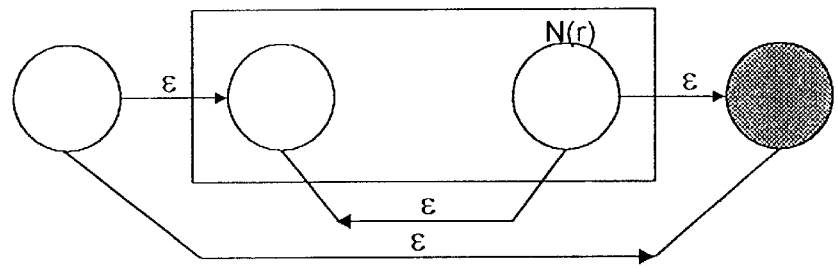

If r is an element, the finite state machine N(r+) is constructed from N(r) using FIG. 17c.

Figure 17D:
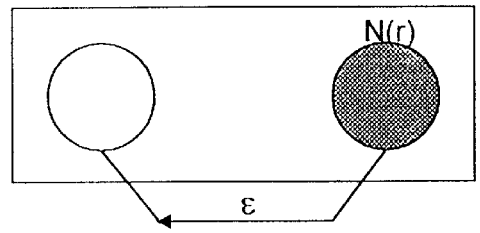

If r is an element, the finite state machine N(r+) is constructed from N(r) using FIG. 17d.

Figure 17E:
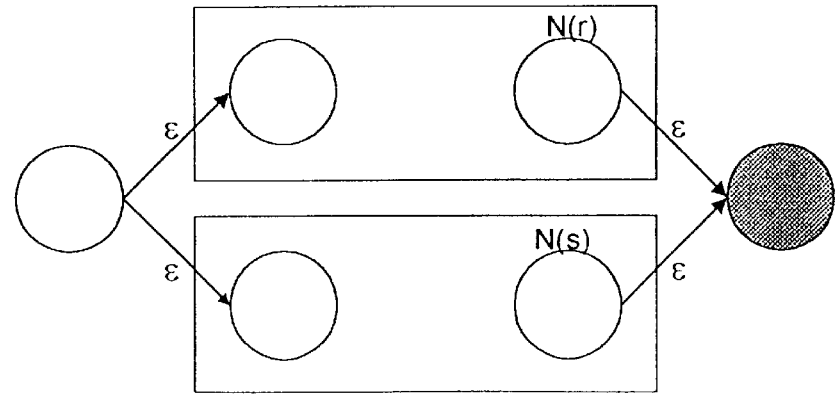

If r and s are elements, N(r|s) is constructed from N(r) and N(s) using FIG. 17e.

If r is an element, the finite state machine for (r) is the same as the one for r.

To make the finite state machine for a whole pattern, the separate states are compiled and then the end state of each element is made to become the start state of the next one.

The result of this process is a non-deterministic finite state machine.

DETERMINISATION OF THE FINITE STATE MACHINE

The algorithm which performs the conversion from a non-deterministic finite state to a deterministic machine is a slightly modified version of the algorithm disclosed in a book by Aho, Sethi and Ullman entitled: "Compilers: Principles, Techniques and Tools" (Addison-Wesley, 1986, pages 118–119).

The algorithm is briefly described below.

First, a subsidiary function, $\epsilon$-enclosure is needed.

$\epsilon$-closure

Input:
   a set of states T
Output:
   a set of states U containing all states in T and all states which can be reached from them by empty transitions
Method:
   push all states in T onto stack
   initialise U to T
   while stack is not empty {
   pop a state t from stack
   for each c-transition from t to a stage u {
      if u is not in U then {
         add u to U
         push u onto stack
      }
   }
   }

For the main deterministic algorithm it is assumed that we have an overall start state for the whole FSM, called $s_o$. A variable states is used to hold a list of sets of states, which may be marked to indicate that they have been processed. Each set of states will form a single state in the resulting determinised FSM. For a given set of states S, we can get a pair <p,T> meaning that if the input symbol is p then T is the set of states which can be reached from some state in S. The aim is to produce an array tran such that tran (S,p) is the set of sets of states which can be reached from state S on input p. As noted, each member of this (i.e. a set of states in the original machine) will become a single state in the new machine.

initialise states to $\epsilon$-closure($S_o$)(unmarked)
   while there is an unmarked state-set S in states{
      mark S
      for each <p,T> which can be reach from S{
         let the set of states U=$\epsilon$-closure(T)
         if U is not in states then {
            add U to states (unmarked)
         }
         tran(S,p):=U
      }
   }

In the resulting machine, a new state is marked as final if any of the original states which it is comprised from are marked as final, and similarly for start states.

A further determination procedure is then applied to resolve ambiguities associated with variables. This algorithm, which is given in detail below is directly taken from the paper by E. Roche and Y. Schabes entitled "Deterministic Part-of-Speech Tagging with Finite State Transducers" referenced hereinabove.

The algorithm is given below in detail.

In the following, for $w_1, w_2 \in \Sigma^*$, $w_1 \wedge w_2$ denotes the longest common prefix of $w_1$ and $w_2$.

The finite-state transducers used have the property that they can be made deterministic; that is, there exists a subsequential transducer that represents the same function. If $T=(\Sigma,Q,i,F,E)$ is such a finite-state transducer, the subsequential transducer $T'=(\Sigma,Q',i',F',\textcircled{x},*,\rho)$ defined as follows is equivalent to T:

$Q' \subset 2^{Q \times \Sigma^*}$. In fact, the determinisation of the transducer is related to the determinisation of FSAs in the sense that it also involves a power set construction. The difference is that the set of states of the original transducer the system could be in has to remembered as well as the words whose emission have been postponed. For instance, a state {($q_1$, $w_1$), ($q_1$,$w_1$)} means that this state corresponds to a path that leads to $q_1$ and $q_2$ in the original transducer and that the emission of $w_1$ (resp. $w_2$) was delayed for $q_1$ (resp. $q_2$).

i'={(i,$\epsilon$)}. There is no postponed emission at the initial state.

the emission function is defined by:

$$S^*a = \wedge \wedge u.\delta(q,a,q')$$
$$(q,u) \in S \quad q' \in d(q,a)$$

This means that, for a given symbol, the set of possible emissions is obtained by concatenating the postponed emissions with the emission at the current state. Since it is desired that the transition to be deterministic, the actual emission is the longest common prefix of this set.

The state transition function is defined by:

$$S\textcircled{x} a = \cup \cup \{(q',(S^*a)^{-1}.u.\delta(q,a,q'))\}$$
$$(q,u) \in S \quad q' \in d(q,a)$$

Given $u, v \in \Sigma^*$, u.v denotes the concatenation of u and v and $u^{-1} v=w$, if w is such that u.w=v, $u^{-1} v=0$ if no such w exits.

F'={S$\in$Q'|$\exists$(q,u)$\in$S and q$\in$F} if S$\in$F', $\rho$(S)=us.t.$\exists$q$\in$F, (q,u)$\in$S.

The determination algorithm given below computes the above sequential transducer.

```
DeterminizeTransducer(T'=(Σ, Q', i', F' ⓧ, *, ρ),
T=(Σ,Q,i,F,E))
   i'=0;q=0;n=1;C'[0]={(0,ε)};F'=0; Q'=0;
   do {
      S=C'[q]; Q'=Q'∪{q};
      if ∃(q,u)∈S s.t.q∈F then F'=F'∪{q}
      and ρ(q)=u;
      for each w such that ∃(q,u)∈S and d(q,w)≠0{
         W'=∧∧u.δ(q,w,q')
            (q,u)∈S q'∈d(q,w)
         q * w=w';
         S'=∪∪{(q', w'⁻¹.u.δ(q, w,q')))};
            (q,u)∈S q'∈d(q,w)
         if ∃r ∃r∈[0,n−1] such that C'[r]==S'
            e=r;
         else
            C'[e=n++]=S';
         qⓧw=e;
      }
      q++;
   }while(q<n);
```

How to apply the algorithm will now be described with reference to an example finite state transducer of FIG. 14.

Figure 18:
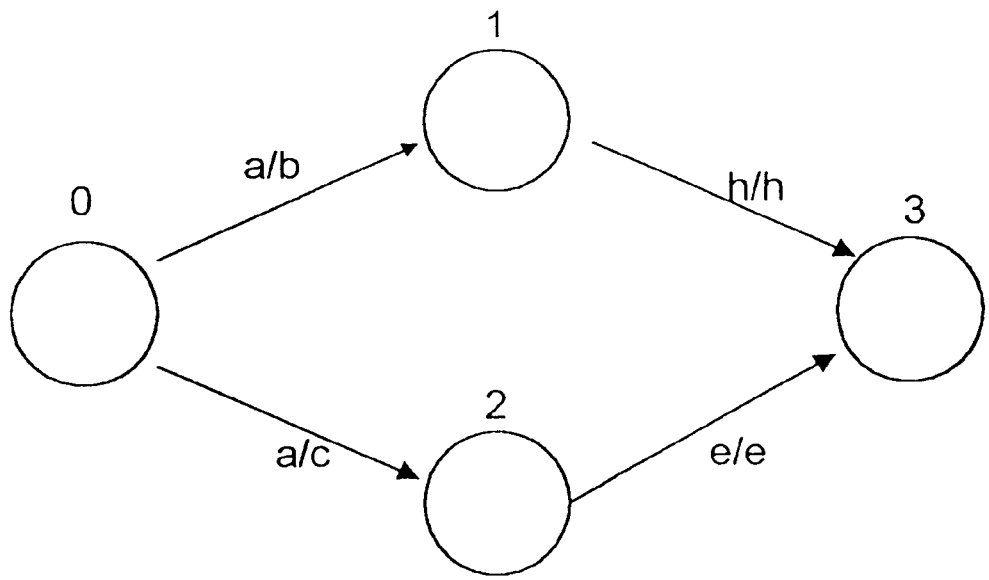
FIG. 18 is a diagram of a non deterministic finite state transducer.
Figure 19:
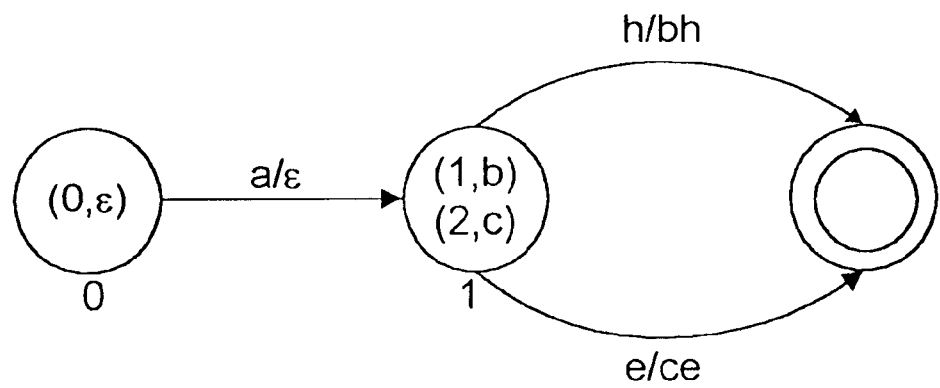
FIG. 19 is a diagram of a determinised finite state transducer.

The determinisation algorithm is applied on the finite-state transducer of FIG. 18 and it builds the subsequential transducer of FIG. 19. Line 1 of the algorithm builds the first state and instantiates it with the pair $\{(0,\epsilon)\}$. q and n respectively denote the current state and the number of states having been built so far. At line 5, one takes all the possible input symbols w; here only a is possible. w' of line 6 is the output symbol, $$w'=\epsilon.(\Lambda\delta(0,a,q')),$$

$$q'\epsilon\{1,2\}$$

thus w'=$\delta(0,a,1)$ $\Lambda\delta(0,a,2)$=b $\Lambda c=\epsilon$. Line 8 is then computed as follows:

$$S'=\cup\cup\{q', \epsilon^{-1}.\delta(0,a,q')\},$$

$$q\epsilon\{0\}q\epsilon\{1,2\}$$

thus S=$\{(1,\delta(0,a,1))\}\cup\{(2,\delta(0,a,2)\}=\{(1,b),(2,c)\}$. Since no r verifies the condition on line 9, a new state e is created to which the transition labelled a/w=a/$\epsilon$ points and n is incremented. On line 15, the program goes to the construction for the transitions of state 1. On line 5, d and e are then two possible symbols. The first symbol, h, at line 6, is such that w' is:

$$w'=\Lambda b.\delta(1,h,q_s)=bh.$$

$$q'\epsilon d(1,h)=\{2\}$$

Henceforth, the computation of line 8 leads to $$S'=\cup\cup\{(q',(bh)^{-1}.b.h)\}=f(2,\epsilon).$$

$$q\epsilon\{1\}q'\epsilon\{2\}$$

State 2 labelled $\{(2,\epsilon)\}$ is thus added, and a transition labelled h/bh that points to state 2 is also added. The transition for the input symbol e is computed the same way.

ALTERNATIVES AND MODIFICATIONS

The present invention provides a processing apparatus acting as an interface between input data in a natural language and data output in a processing usable form. The present invention is applicable to any natural language and the units of the natural language are not limited to words of the natural language and can comprise any appropriate units from which the natural language can be built and which can be categories into different categories. Embodiments of the invention may be constructed to operate with other languages including languages in which words as such are not employed an example of such a language is Japanese when written with Kanji and Kana characters.

Although in the specific embodiment words are used as the information content of the data units, lexical units can be used which can comprise the stem of the word, or any meaning representation representing a number of synonyms can be used. It is particularly useful when the input data is to be matched to reference data since it enables the meanings of the input phrase and the reference phrase to be matched, rather than exactly matching the words. For example, it is desirable to be able to match the input "switch-on the light" the reference data "turn-on the light". The same meaning representation can result from the term "switch-on" and the term "turn-on". This can be achieved by using a lexicon which generates a lexical unit which encompasses synomyns for example. Thus the data units comprise unit identification data which can comprise anything which identifies the meaning of the data unit e.g. a word, lexical unit or meaning representation and corresponding unit category data e.g. parts of speech or some other form of categorisation of the data unit.

In the specific embodiment the input words are matched with a lexicon which includes all of the possible inflections for the word. Alternatively, the lexicon could contain only the stem of the word and the lexical processor could strip away the prefixes and suffixes thus removing the inflection.

Although the embodiment has been described as comprising a deterministic finite state machine, the present invention will also operate with a non-deterministic finite state machine. The use of a deterministic finite state machine is however preferred for reasons of computational efficiency.

In the specific embodiment in addition to the lexical processor, a tagger is used. The use of such a tagger is not however essential. Any method of generating unit category data can be used. For example, the lexical processor could incorporate some degree of context processing in order to decide on an appropriate part of speech tag for an output lexical unit. Alternatively, the generation of the unit category data can simply comprise the looking up of the part of speech from the lexicon and using one of the parts of speech at a time in a multiple analysis if there is more than one part of speech for the lexical unit.

Although the embodiment of the finite state parser is illustrated as being implemented in software on a standard multi-purpose computer, the present invention can also be implemented in specifically designed hardware. In particular, the finite state machine can be implemented in logic in which case the various stages of the finite state machine are implemented logically or spatially sequentially and not temporarily sequentially.

An aspect of the present invention utilises finite state machines in a cascaded arrangement because they can be implemented efficiently and quickly using a computer. A limitation of such implementations is they cannot parse deeply nested sentences without increasing the number of stages needed which reduces the efficiency. In order to increase the parsing speed, it is necessary to trade of the ability of the parser to successfully parse complex grammatical constructions.

Although the present invention has been described hereinabove with reference to the specific embodiments the present invention is not limited to the specific embodiments and it will be apparent to the skilled person in the art that modifications are possible within the spirit and scope of the present invention.

What is claimed is:

1. Processing apparatus for generating data in a processor usable form from input data in the form of units in a natural language in which the units are of a plurality of different categories, the processing apparatus comprising:

data unit generating means for categorizing units of input data into respective categories to generate processor usable data units comprising unit data and corresponding unit category data, said data units comprising one of a group consisting of words, lexical units and semantic units and said unit category data comprising one of a group consisting of parts of speech, words and lexical features; and a cascaded plurality of finite state matching means, each of said finite state matching means being configured in accordance with grammar rules for the natural language, a first of said cascaded plurality of finite state matching means being operable to match said unit category data with at least one predetermined pattern of unit category data and to output group category data for any said unit category data found to match said at least one predetermined pattern of unit category data, the or each other said finite state matching means of the cascade being operable to use any unmatched unit category data and said group category data from at least one previous said finite state matching means of the cascade in place of matched category data to match said unit and/or group category data with at least one predetermined pattern of unit and/or group category data and to output new group category data for any unit and/or group category data found to match said at least one predetermined pattern of unit and/or category data;

wherein at least one of said finite state matching means is operable to output said unit data corresponding to matched unit category data as a plurality of variables, at least one said variable being indexed by another said variable.

2. Processing apparatus according to claim 1, wherein at least one of said finite state matching means is operable to index the indexed variables by variables output from a previous said finite state matching means in the cascade.

3. Processing apparatus according to claim 1, wherein said finite state matching means are deterministic.

4. Processing apparatus according to claim 1, wherein said finite state matching means are configured to output said variables when said finite state matching means transit from one state to another, each transition corresponding to a matching of unit or group category data from the input data with unit or group category data in a said pattern.

5. Processing apparatus according to claim 1, and wherein said at least one finite state matching means is adapted to output said unit data as variables defining head units and modifier units of segments of the data units, the or each corresponding indexed variable defining a unit data of a modifier unit.

6. Processing apparatus according to claim 1, wherein said at least one finite state matching means is adapted to output one or more said indexed variable with an index comprising the unit data of a unit of data being modified.

7. Processing apparatus according to claim 5, wherein said at least one finite state matching means is adapted to output said variables as a plurality of different variables, each variable defining a different syntactic modification.

8. Processing apparatus according to claim 1, wherein at least one of said finite state matching means is operable to index the indexed variables by variables output from said finite state matching means.

9. Processing apparatus according to claim 1, wherein said group category data defines syntactic structures in the input data.

10. Processing apparatus according to claim 1, wherein said data units comprise one of a group consisting of words, lexical units and semantic units.

11. Processing apparatus according to claim 1, wherein said finite state matching means are adapted to output non indexed variables for said input data and then output said indexed variables for said input data.

12. Processing apparatus according to claim 1, wherein said finite state matching means are adapted to store said variables and instructions for indexing said indexed variables for said input data, and to subsequently implement said instructions to index said indexed variables.

13. Processing apparatus according to claim 1, wherein said data unit generating means includes a lexicon containing lexical units and corresponding parts of speech data, and a lexical processor for receiving said input data in the form of text words, matching the text words with lexical units, outputting the matched lexical units as said unit data, and outputting said corresponding parts of speech data as said unit category data.

14. Processing apparatus according to claim 13, including means for correcting any incorrectly assigned parts of speech data by a statistical context analysis.

15. Control apparatus for controlling the operation of a system, the control apparatus comprising:

the processing apparatus according to claim 1;

comparing means for comparing said variables generated from said input data with variables generated from reference data by comparing variables starting from a variable indicated to be the head of said input data or reference data which does not modify any others of said input data or reference data in accordance with relationships defining equivalence between said variables; and control means for controlling the operation of a system in accordance with the result of the comparison.

16. A processor implemented method of generating data in processor usable form from input data in the form of units in a natural language in which the units are of a plurality of different categories, the method comprising:

categorizing units of input data into respective categories to generate processor usable data units comprising unit data and corresponding unit category data, said data units comprising one of a group consisting of words, lexical units and semantic units and said unit category data consisting of parts of speech, words and lexical features;

a first matching step of using a cascaded plurality of finite state matching means to match said unit category data with at least one predetermined pattern of unit category data and to output group category data for any said unit category data found to match said at least one predetermined pattern of unit category data, each of said finite state matching means being configured in accordance with grammar rules for the natural language;

at least one further matching step using a finite state matching means of using any unmatched said unit category data and said group category data from at least one previous matching step in place of matched category data to match said unit and/or group category data with at least one predetermined pattern of unit and/or group category data, and outputting new group category data for any unit and/or group category data found to match said at least one predetermined pattern of unit and/or category data;

wherein at least one of said matching step outputs said unit data corresponding to matched unit category data as a plurality of variables, and at least one said variable is indexed by another said variable.

17. A method according to claim 16, wherein said finite state matching means are deterministic.

18. A method according to claim 16, wherein said finite state matching means output said variables when said finite state machines transit from one state to another, each transition corresponding to a matching of unit or group category data from the input data with unit or group category data in a said pattern.

19. A method according to claim 16, wherein said unit data is output as said variables defining head units and modifier units of segments of the data units, the or each indexed variable defining a unit data of a corresponding modifier unit.

20. A method according to claim 19, wherein at least one said matching step outputs one or more said indexed variable with an index comprising the unit data of a unit of data being modified.

21. A method according to claim 16, wherein said at least one further matching step outputs said variables as a plurality of different variables, each variable defining a different syntactic modification.

22. A method according to claim 16, wherein in at least one of said matching steps the indexed variables are indexed by variables output from the matching step.

23. A method according to claim 16, wherein in at least one of said matching steps the indexed variables are indexed by variables output from a previous matching step.

24. A method according to claim 16, wherein said unit category data comprises one of a group consisting of parts of speech, words, and lexical units.

25. A method according to claim 16, wherein said group category data defines syntactic structures in the input data.

26. A method according to claim 16, wherein said data units comprise one of a group consisting of words, lexical units and semantic units.

27. A method according to claim 16, wherein the matching steps output non indexed variables for said input data and then repeat to output indexed variables for said input data.

28. A method according to claim 16, wherein the matching steps store said variables and instructions for indexing said indexed variables for said input data, and said instructions are subsequently executed to index said indexed variables.

29. A method according to claim 16, wherein said data units are generated by receiving said input data as text words, looking up said text words in a lexicon containing lexical units and corresponding parts of speech to output matched lexical units as said unit data and corresponding parts of speech data as said unit category data.

30. A method according to claim 29 including the step of correcting any incorrectly assigned parts of speech by a statistical context analysis.

31. A method of controlling a system comprising the method of claim 16;

comparing said variables generated from said input data with variables generated from reference data by comparing variables starting from a variable indicated to be the head of said input data or reference data which does not modify any others of said input data or reference data respectively, in accordance with relationships defining equivalence between said variables; and controlling the operation of a system in accordance with the result of the comparison.

32. A carrier medium carrying processor implementing instructions for controlling a processor to carry out the method according to claim 16.

33. A signal carrying processor implementing instructions for controlling a processor to carry out the method according to claim 16.

* * * * *

UNITED STATES PATENT AND TRADEMARK OFFICE
CERTIFICATE OF CORRECTION

PATENT NO.     : 6,505,157 B1
DATED          : January 7, 2003
INVENTOR(S)    : Elworthy It is certified that error appears in the above-identified patent and that said Letters Patent is hereby corrected as shown below:

<u>Title page,</u>
Item [56], References Cited, OTHER PUBLICATIONS, in "The Proceedings of the Third Conference on Applied natural Language Processing", "natural" should read -- Natural --.

Figure 5:
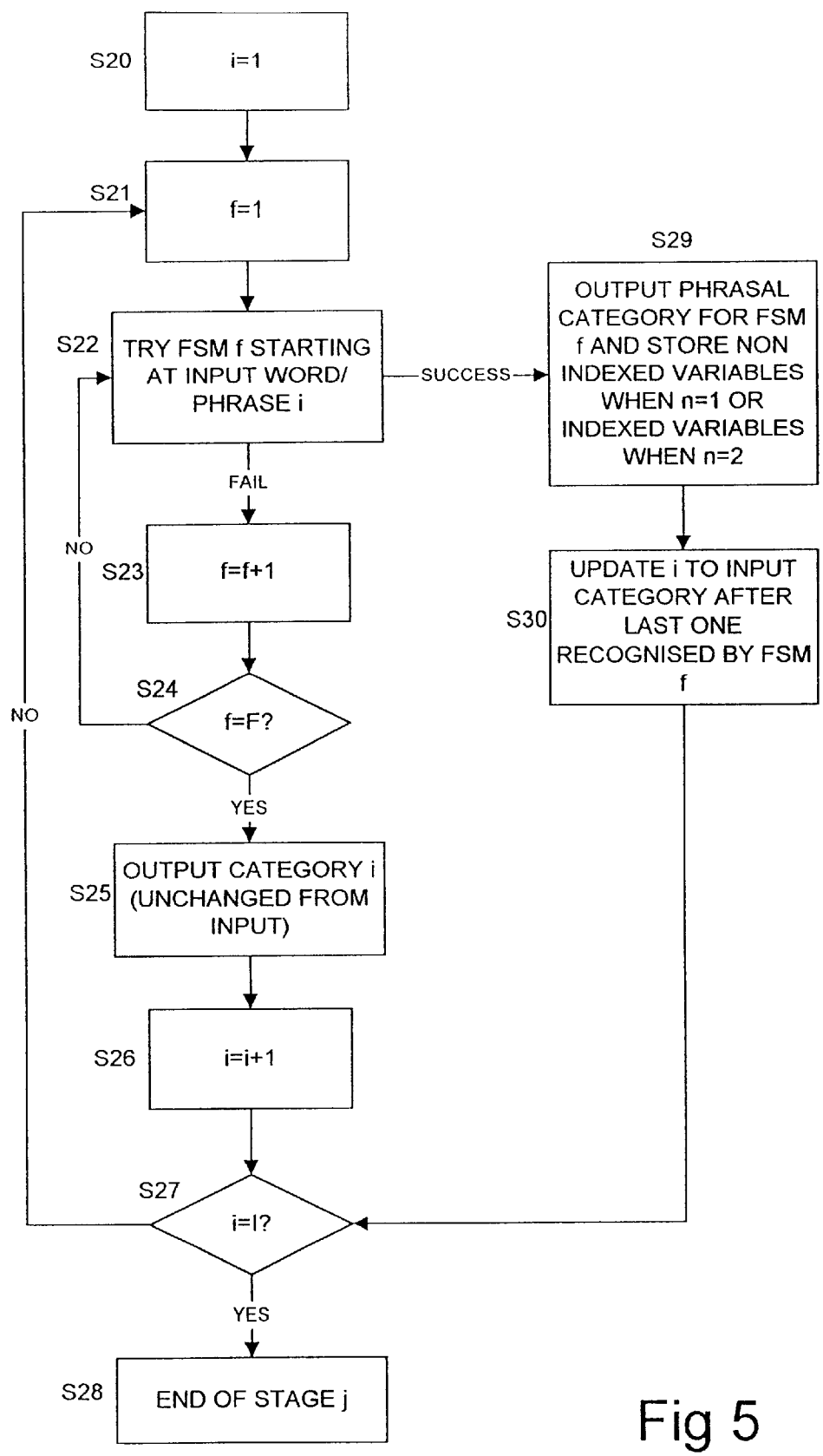
FIG. 5 is a flow diagram detailing the steps of step S7 in FIG. 4.
Figure 6:
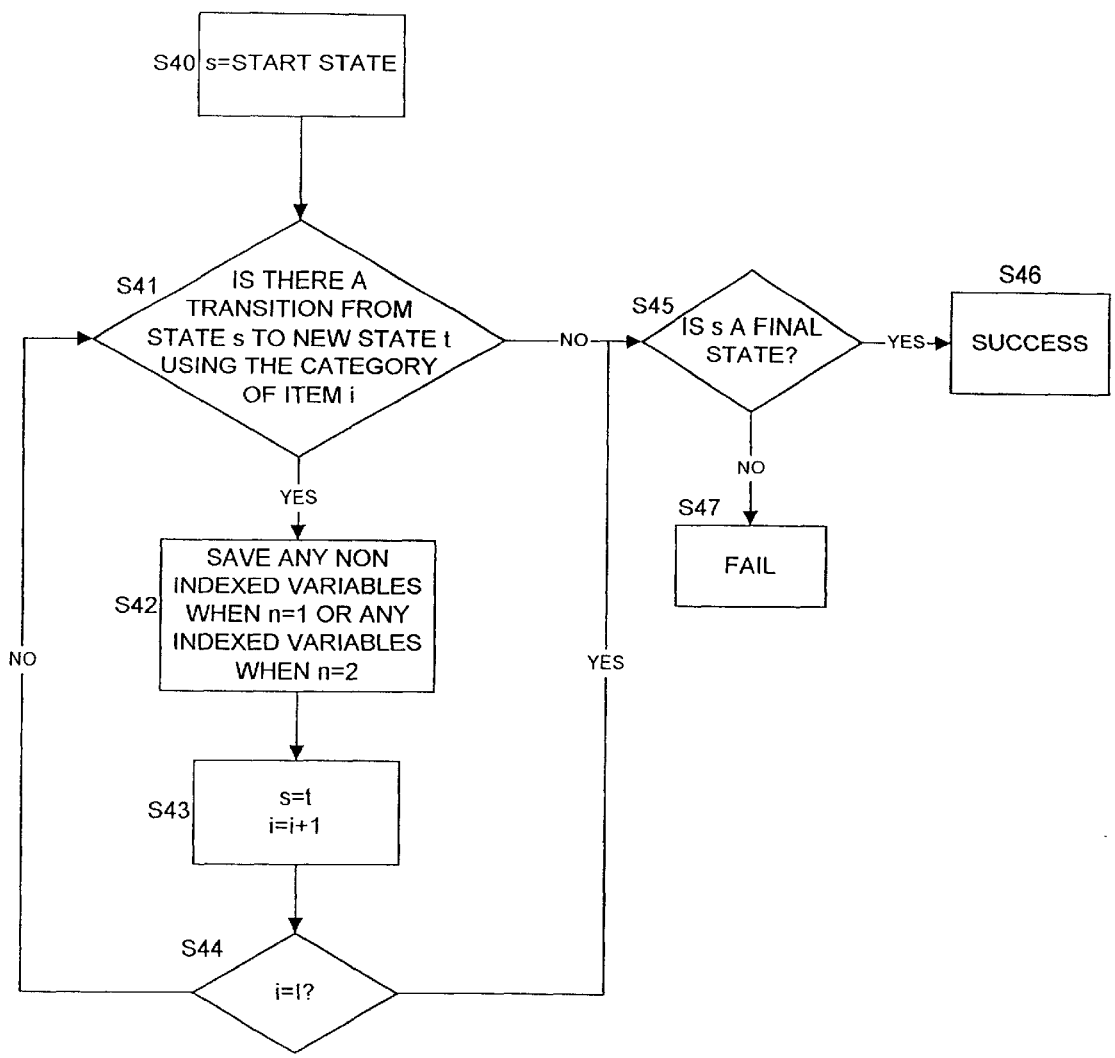
FIG. 6 is a flow diagram detailing the steps of step S22 in FIG. 5.

<u>Drawings,</u>
Sheet 5, Fig. 5, Step S30, "RECOGNISED" should read -- RECOGNIZED --.
Sheet 8, Fig. 8, Step S70, "RECOGNISED" should read -- RECOGNIZED --.
Sheet 10, Fig. 10a, Step S140, "NON INDEXED" should read -- NON-INDEXED --.

<u>Column 1,</u>
Line 14, "can" should read -- can be --.

<u>Column 3,</u>
Line 64, "non deterministic" should read -- non-deterministic --.

<u>Column 4,</u>
Line 16, "speech ." should read -- speech. --.

<u>Column 5,</u>
Line 42, "utilise" should read -- utilize --.

<u>Column 7,</u>
Line 4, "carry" should read -- carrying --.
Line 10, "recognises" should read -- recognizes --.

<u>Column 10,</u>
Line 58, "recognised" should read -- recognized --.

<u>Column 11,</u>
Line 32, "are" should read -- and are --.

<u>Column 12,</u>
Line 19, "of" should be deleted.

UNITED STATES PATENT AND TRADEMARK OFFICE
CERTIFICATE OF CORRECTION

PATENT NO. : 6,505,157 B1
DATED : January 7, 2003
INVENTOR(S) : Elworthy

It is certified that error appears in the above-identified patent and that said Letters Patent is hereby corrected as shown below:

Column 15,
Lines 49 and 51, "non indexed" should read -- non-indexed --.
Line 59, "initialisation" should read -- initialization --.

Column 16,
Line 17, "non indexed" should read -- non-indexed --.
Line 56, "recognised" should read -- recognized --.

Column 17,
Line 49, "is" should be deleted.

Column 18,
Line 15, "recognised" should read -- recognized --.

Column 19,
Lines 27, 29, 32 and 35, "recognised" should read -- recognized --.

Column 22,
Line 43, "and." should read -- and --.

Column 24,
Line 48, "e" should read -- $\in$ --.

Column 25,
Lines 28 and 51, "initialise" should read -- initialize --.
Line 55, "reach" should read -- reached --.

Column 26,
Line 18, "to" should read -- to be --.
Line 41, "exits" should read -- exists --.

Column 27,
Line 49, "categories" (first occurrence) should read -- categorized --.
Line 52, "employed an" should read -- employed. An --.
Line 64, "the" (first occurrence) should read -- with the --.
Line 67, "synomyns" should read -- synonyms --.

UNITED STATES PATENT AND TRADEMARK OFFICE
CERTIFICATE OF CORRECTION

PATENT NO. : 6,505,157 B1
DATED : January 7, 2003
INVENTOR(S) : Elworthy

It is certified that error appears in the above-identified patent and that said Letters Patent is hereby corrected as shown below:

Column 28,
Line 36, "utilises" should read -- utilizes --.

Column 29,
Line 6, "the or" should read -- at least one other of --
Line 7, "each other" should be deleted.
Line 58, "non" should read -- non- --.

Column 31,
Line 24, "non indexed" should read -- non-indexed --.

Column 32,
Line 7, "claim 29" should read -- claim 29, --.

Signed and Sealed this

Thirtieth Day of September, 2003

JAMES E. ROGAN
*Director of the United States Patent and Trademark Office*